United States Patent [19]
Bauman et al.

[11] Patent Number: 5,875,462
[45] Date of Patent: Feb. 23, 1999

[54] MULTI-PROCESSOR DATA PROCESSING SYSTEM WITH MULTIPLE SECOND LEVEL CACHES MAPABLE TO ALL OF ADDRESSABLE MEMORY

[75] Inventors: Mitchell A. Bauman, Circle Pines; Donald C. Englin, Shoreview; Mark L. Balding, Cottage Grove, all of Minn.

[73] Assignee: Unisys Corporation, Blue Bell, Pa.

[21] Appl. No.: 579,897

[22] Filed: Dec. 28, 1995

[51] Int. Cl.⁶ .............................. G06F 13/00; G06F 12/08
[52] U.S. Cl. ..................... 711/119; 711/117; 711/118; 711/120; 711/121; 711/122; 711/141; 711/143; 711/144; 711/145; 711/146; 711/137; 711/154
[58] Field of Search ..................................... 395/471, 449, 395/448, 447, 472, 457; 711/117–125, 141–147, 154, 137

[56] References Cited

U.S. PATENT DOCUMENTS

| | | | |
|---|---|---|---|
| 4,442,487 | 4/1984 | Fletcher | 395/449 |
| 4,445,174 | 4/1984 | Fletcher | 395/448 |
| 4,513,367 | 4/1985 | Chan et al. | 711/145 |
| 4,586,133 | 4/1986 | Steckler | 395/465 |
| 4,755,930 | 7/1988 | Wilson et al. | 711/122 |
| 4,985,829 | 1/1991 | Thatte | 395/417 |
| 5,023,776 | 6/1991 | Gregor | 395/449 |
| 5,029,070 | 7/1991 | McCarthy | 395/470 |
| 5,265,232 | 11/1993 | Gannon | 395/451 |
| 5,265,235 | 11/1993 | Sindhu | 395/447 |
| 5,276,848 | 1/1994 | Gallagher | 395/448 |
| 5,307,477 | 4/1994 | Taylor | 395/403 |
| 5,317,716 | 5/1994 | Liu | 711/144 |
| 5,325,503 | 6/1994 | Stevens et al. | 711/146 |
| 5,355,467 | 10/1994 | MacWilliams | 395/473 |
| 5,359,723 | 10/1994 | Mathews | 395/449 |
| 5,386,547 | 1/1995 | Jouppi | 395/449 |
| 5,392,416 | 2/1995 | Doi | 395/403 |
| 5,423,016 | 6/1995 | Tsuchiya | 395/450 |
| 5,426,754 | 6/1995 | Grice et al. | 395/451 |
| 5,530,832 | 6/1996 | So et al. | 711/122 |
| 5,537,640 | 7/1996 | Pawlowski et al. | 395/473 |
| 5,603,005 | 2/1997 | Bauman et al. | 711/124 |
| 5,625,892 | 4/1997 | Bauman et al. | 455/69 |
| 5,671,391 | 9/1997 | Knotts | 711/143 |
| 5,684,977 | 11/1997 | Van Loo et al. | 711/143 |

Primary Examiner—Tod R. Swann
Assistant Examiner—Denise Tran
Attorney, Agent, or Firm—Beth L. McMahon; Charles A. Johnson; Mark T. Starr

[57] ABSTRACT

A cache architecture for a multiprocessor data processing system. The cache architecture includes multiple first-level caches, two second-level caches, and main storage that is addressable by each of the processors. Each first-level cache is dedicated to a respective one of the processors. Each of the second-level caches is coupled to the other second-level cache, coupled to the main storage, and coupled to predetermined ones of the first-level caches. The range of cacheable addresses for both of the second-level caches encompasses the entire address space of the main storage. Each of the second-level caches may be viewed as dedicated for write access to the set of processors associated with the predetermined set of first-level caches, and shared for read access to the other set of processors. The dedicated and shared nature enhances system efficiency. The cache architecture includes coherency control that filters invalidation traffic between the second-level caches. The filtering of invalidation traffic enhances system efficiency and is accomplished by tracking which second-level cache has the most recent version of the cached data.

21 Claims, 14 Drawing Sheets

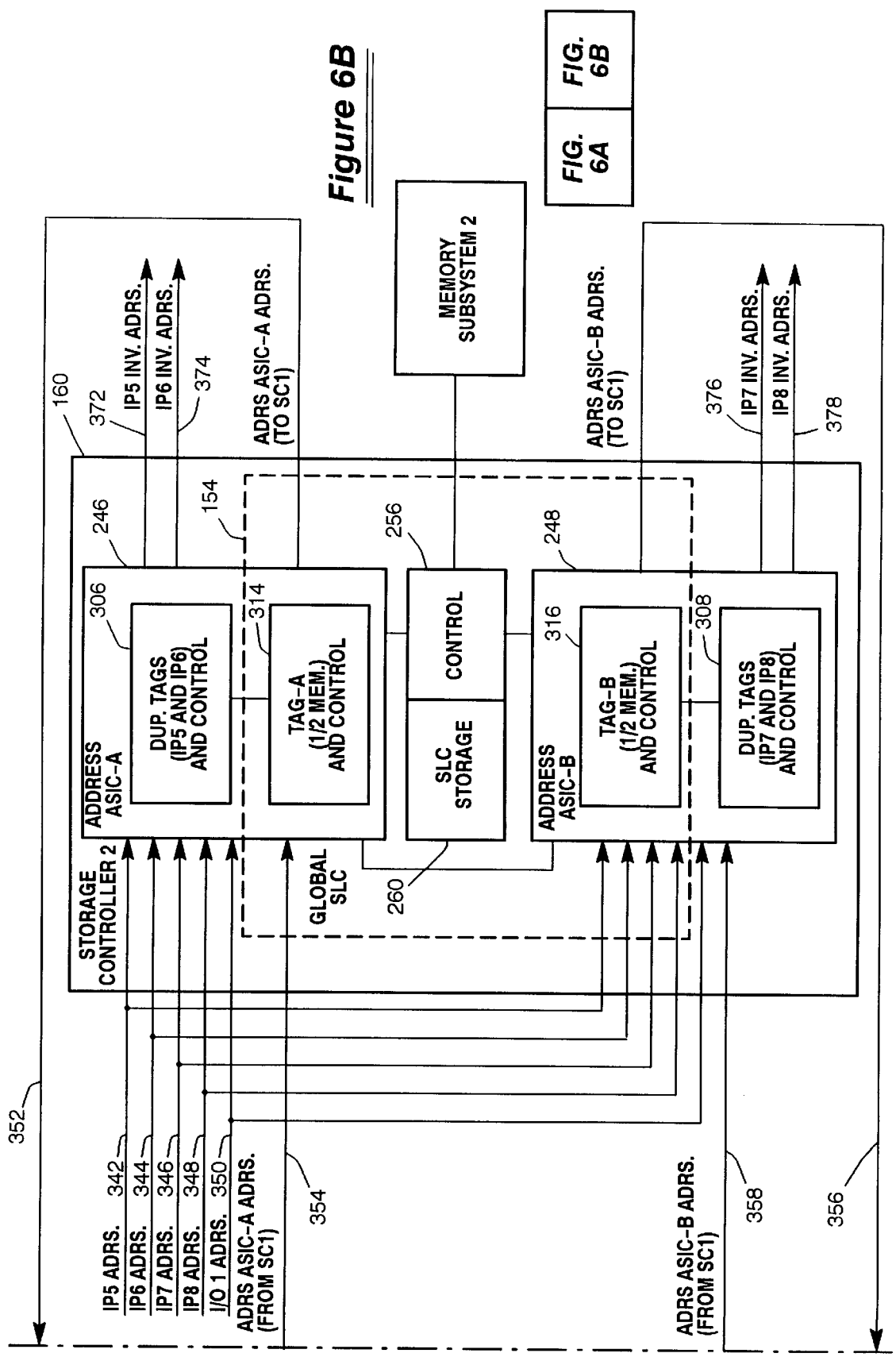

LOCAL WRITE HIT WITH OWNERSHIP TIMING DIAGRAM

REMOTE HIT WRITE TIMING BLOCK DIAGRAM

| REQUEST TYPE | PRESENT STATE | | | | | | TAG INVALIDATION RESULTS | | | | ACTION |
|---|---|---|---|---|---|---|---|---|---|---|---|
| | LOCAL STATE | | | REMOTE STATE | | | LOCAL INVALIDATE RESULTS | | REMOTE INVALIDATE RESULTS | | |
| | RD PM | LAST-MOD | MISS | RD PM | LAST-MOD | MISS | SLC TAG | DUP. TAGS | SLC TAG | DUP. TAGS | |
| READ | X | | | | | | | | | | READ FROM LOCAL SLC |
| READ | | X | | | | | | | | | READ FROM LOCAL SLC |
| READ | | | X | X | | | | | | | READ FROM REMOTE SLC<br>XFER COPY TO LOCAL SLC<br>SET LOCAL RD PM |
| READ | | | X | | X | | | | | | READ FROM REMOTE SLC<br>XFER COPY TO LOCAL SLC<br>CLEAR REMOTE LAST-MOD.<br>SET LOC AND REM RD PM |
| READ | | | X | | | X | | | | | IF ADR IS TO REMOTE MEM<br>THEN<br>  READ FROM REM MEM<br>  XFER COPY TO LOCAL SLC<br>  SET LOCAL RD PM<br>ELSE<br>  REM XFER ACK TO LOC<br>  READ FROM LOCAL MEM<br>  XFER COPY TO LOCAL SLC<br>  SET LOC RD PM |
| WRITE | X | | | X | | | X | X | X | | REM XFER OWN ONLY<br>LOC AND REM CLEAR RD PM<br>LOC SETS LAST-MOD. |
| WRITE | X | | | | | X | X | | | | REM XFER ACK TO LOC<br>LOC CLEARS RD PM<br>LOC SETS LAST-MOD. |
| WRITE | | X | | | | | X | | | | WRITE DATA TO LOC SLC |
| WRITE | | | X | X | | | X | X | X | | XFER DATA FROM REM TO LOC<br>CLEAR REM RD PM<br>SET LOC LAST-MOD. |
| WRITE | | | X | | X | | X | X | X | | XFER DATA FROM REM TO LOC<br>CLEAR REM WR OWN<br>SET LOC LAST-MOD. |
| WRITE | | | X | | | X | X | | X | | IF ADR IS TO REMOTE MEM<br>THEN<br>  XFER DATA FROM REM<br>  MEM TO LOC SLC<br>ELSE<br>  REM XFER ACK TO LOC<br>  READ FROM LOCAL MEM<br>ENDIF<br>SET LOCAL LAST-MODIFIED |

*Figure 11*

MULTI-PROCESSOR DATA PROCESSING SYSTEM WITH MULTIPLE SECOND LEVEL CACHES MAPABLE TO ALL OF ADDRESSABLE MEMORY

CROSS-REFERENCE

This patent application is related to the U.S. patent application Ser. No. 08/579,683, entitled, A MULTI-PROCESSOR DATA PROCESSING SYSTEM WITH MULTIPLE, SEPARATE INSTRUCTION AND OPERAND SECOND LEVEL CACHES MAPABLE TO ALL OF ADDRESSABLE MEMORY, filed concurrent herewith by Bauman et al., which is assigned to the assignee of the present invention, anti incorporated herein by reference and which issued on Oct. 21, 1997 as U.S. Pat. No. 5,680,571.

BACKGROUND

1. Field of the Invention

This invention generally relates to cache architectures for data processing systems and more particularly to a shared memory multi-processor data processing system having a plurality of second level caches.

2. Description of the Prior Art

Prior multi-processor data processing systems have used multi-level caching to enhance system performance. A popular configuration includes first level caches, a respective one coupled and dedicated to one of the processors, a second level cache that is shared by the processors, and a main memory that is above the second level cache in the storage hierarchy and which is shared by the processors. Data access time is reduced for data that is resident in a lower level in the storage hierarchy.

Two common types of second level caches that are found in the prior art are a centralized second level cache that maps to all of addressable memory, and a second level cache that is divided into multiple portions with each portion mapping to a predetermined address range of addressable memory. U.S. Pat. No. 5,265,232 to Gannon et al. and entitled, COHERENCE CONTROL BY DATA INVALIDATION IN SELECTED PROCESSOR CACHES WITHOUT BROADCASTING TO PROCESSOR CACHES NOT HAVING THE DATA, (hereinafter, Gannon) illustrates the centralized second level cache approach, and U.S. Pat. No. 5,423,016 to Tsuchiya et al. entitled, BLOCK BUFFER FOR INSTRUCTION/OPERAND CACHES, (hereinafter Tsuchiya) illustrates the non-centralized approach. The cache architecture of the co-pending patent application is similar to Tsuchiya.

In the system described by Gannon, there are multiple processors, each having a dedicated store-through first level cache. A centralized second level cache is shared by the plurality of processors and is mapped to all of the addressable memory. The second level cache has a priority control for selecting which memory request to process. Thus, all memory requests are funneled through the second level cache.

The cache architecture of Tsuchiya has a second level cache with multiple segments, where each segment is mapable to only a portion of the addressable memory. Each segment is dedicated to caching a predetermined range of the addressable memory space. A memory request is routed to a respective one of the second level cache segments depending upon the address range in which the memory request falls. As compared to Gannon, Tsuchiya reduces contention between the processors for access to the second level cache segments because there are multiple second level caches. However, the tradeoff is that there may be extra overhead in routing the memory requests to the proper second level caches.

In a multiprocessor system, a data coherency strategy must be implemented to ensure that each of the processors has a consistent view of the cached data. If each of two processors has the same addressable data unit in its first level cache and one of the processors modifies the data unit, the other processor must be notified that the corresponding data unit in its first level cache is invalid. Gannon uses a centralized directory for coordinating data coherency between the processors and their respective first level caches. In the co-pending patent application, duplicate-directories of the first level cache directories (hereinafter "duplicate tags") are used for coordinating data coherency.

The centralized directory of Gannon is built upon the concept of exclusive and public ownership of a data unit by the processors. Before a processor is allowed to modify a data unit, it must first obtain ownership of the data unit. The ownership of a data unit is maintained in the first level cache directory (hereinafter "tag") and in the centralized cache directory, thereby eliminating the need for duplicate tags. The concept of exclusive ownership eliminates the need to search and invalidate first level cache tags of the other processors when a data unit is modified. However, when a processor does not have exclusive ownership of a data unit and the processor needs to modify the data unit, the first level cache tags of all the other processors must first be searched and appropriate data units invalidated, thereby interrupting and adversely impacting all the other processors.

The duplicate tags of the co-pending patent application are used to filter invalidation requests to the first level cache tags. When a processor modifies a data unit in its first level cache, an invalidation request is broadcast to all the duplicate tags. The duplicate tags are searched for the address of the referenced data unit. If the address is found in a duplicate tag, the address is marked invalid and the corresponding address entry in the first level cache tag is also marked invalid. If the address of the referenced data unit is not present in the duplicate tag, the respective processor is not interrupted to invalidate an entry in its first level cache tag.

SUMMARY OF THE INVENTION

The Gannon system has two disadvantages. First, requests from all the processors are processed by the centralized second level cache. Second, to accomplish cache coherency, the ownership mechanism requires searching all the first level cache tags for changes of ownership.

In Gannon, all the processors are coupled to the centralized second level cache. Therefore, the centralized second level cache must prioritize all of the incoming requests. If there is a large volume of requests from the processors to the centralized second level cache, the second level cache may become a bottleneck.

The centralized cache directory along with Gannon's concept of ownership is intended to eliminate duplicate tags and limit the invalidation requests that must be processed by the first level cache tags. However, the tradeoff that is made is that before a data unit may be modified by a processor, the processor must first obtain exclusive ownership of the data unit. In obtaining exclusive ownership, the first level cache tags of all the other processors must be searched for the data unit and appropriately invalidated. Because Cannon does not have duplicate tags, the first level cache tags must be searched. The searching of the first level cache tags reduces the efficiency of the affected processors.

The cache architecture of the co-pending application has two disadvantages. First, the second level cache may be a bottleneck for memory requests, and second, excessive invalidation requests are generated when a data unit is modified.

Similar to Gannon, the second level cache of the co-pending application may be a bottleneck because the second level cache is comprised of a plurality of segments, with each of the segments dedicated to caching a predetermined address range of addressable memory.

The way in which data coherency is managed in the co-pending application is different from the way in which Gannon handles data coherency. Data coherency in the co-pending application is managed with duplicate tags. When a data unit is updated by a processor, an invalidation request is routed to all the duplicate tags for the other processors. The duplicate tags are searched for the address of the referenced data unit. If the address is found in a duplicate tag, the address is marked invalid and the corresponding address entry in the first level cache tag is also marked invalid. If the address of the referenced data unit is not present in the duplicate tag, the respective processor is not interrupted to invalidate an entry in its first level cache tag. Thus, filtering by the duplicate tags of invalidation requests reduces the interruptions to the processors.

A drawback of the data coherency approach of the co-pending application is that invalidation requests may be unnecessarily broadcast to the duplicate tags of the other processors. For example, if a processor performs successive modifications to the same data unit (without another processor modifying the data unit), the invalidation request resulting from the second modification is broadcast to the duplicate tags of all the other processors, even though the tags of the other processors were invalidated after the first modification. The result is a high volume of invalidation traffic being processed against the duplicate tags. Decreased processing efficiency and additional address interfaces (for) the invalidation requests) are the net result.

Therefore it would be desirable for a multiprocessor data processing system having a multi-level storage hierarchy in which an intermediate level of the storage hierarchy is shared by the multiple processors, to minimize interprocessor contention for access to the intermediate level of storage and to efficiently maintain cache coherency.

It is an object of the invention to minimize contention between the processors for access to the intermediate level of the storage hierarchy.

A further object of the invention is to is to efficiently maintain cache coherency.

Another object is to provide multiple second-level caches, in which the cacheable address range of each of the second-level caches encompasses the entire address space of the data processing system.

Yet a further object is to eliminate unnecessary invalidation requests between the caches.

Another object is to dedicate for write access a first second-level cache to a first set of processors and dedicate for write access a second second-level cache to a second set of the processors, and to permit read access for the first second-level cache to the second set of processors and to permit read access for the second second-level cache to the first set of processors.

A further object still is to track which one of the second-level caches has the most recent version of cached data.

These and other objects are attained in a multiprocessor data processing system. Each of the processors in the system has an associated, dedicated, store-through first-level cache. An intermediate level of storage in the storage hierarchy includes at least two second-level caches. A first one of the second-level caches is coupled to predetermined ones of the processors, and the second second-level cache is coupled to the remaining ones of the processors. The second-level caches are interconnected and both are coupled to the system's shared main memory.

Both of the second-level caches are global second-level caches. This means that the range of addresses that is cacheable by either of the second-level caches encompasses the entire address space of the system's shared main memory. Each of the second-level caches is dedicated in that storing data into a second-level cache is limited to requests generated by the predetermined coupled processors. This limits contention for access to each of the second level caches. On the other hand, the second-level caches are shared in that read access to the second-level caches is permitted for all the processors in the system. This effectively increases the size of the second-level caches for read accesses.

The efficiency is enhanced for the process of maintaining cache coherency in the multiprocessor data processing system. Because each of the processors in the system has its own first-level cache, when one of the processors modifies data by issuing a write request, steps must be taken to ensure that if any of the first-level caches have an outdated copy of the data, the appropriate first-level caches are informed that their version of the data is invalid. The general process is referred to herein as invalidation processing. The present invention enhances the efficiency of invalidation processing by tracking which second-level cache has the most recent version of cached data. This reduces the amount of invalidation traffic throughout the system by "filtering-out" or not sending invalidation notices to processors whose associated second-level cache does not have the most recent version of the data. This can be accomplished because it is known that invalidation has already occurred in the first-level caches of the processors coupled to the second-level cache that does not have the most recent version of the data. The invalidation filtering can be summarized as follows.

Each of the second-level caches has a tag directory in which each entry identifies a unit of data that is present in the second-level cache. For each of the entries in the tag directory, two indicators are maintained: a valid indicator and a last-modified indicator. The valid indicator indicates whether the associated data unit that is cached is up-to-date (i.e., whether the data unit has been updated by another processor). The last-modified indicator indicates whether the associated unit of data was last modified in the respective second-level cache.

As an example, if a write request is initiated by a first processor to its associated second-level cache, and if the requested data unit is designated as valid and last-modified in the second-level cache, the data unit is updated in the second-level cache and invalidation processing is initiated for the first-level caches of the other processors that are coupled to the second-level cache. The elimination of invalidation traffic is with respect to the processors coupled to the other second-level cache. The second-level cache that processed the write request recognizes that it already had the most recent version of the data, i.e., it was "last-modified" by the second-level cache, and therefore does not need to initiate invalidation processing for the first-level caches of the processors coupled to the other second-level cache.

The last-modified indicator may be used to filter invalidation requests because if it is set it is known that the first-level caches of the processors coupled to the other second-level cache have already undergone invalidation processing, thereby eliminating the need for further invalidation. This is illustrated with the following example. If a first processor initiates a write request to its second-level cache and the second-level cache finds that it does not have the most recent version of the data, the second-level cache initiates invalidation processing for the other second-level cache and for the first-level caches of all the processors in the system, writes the data unit in its second-level cache storage, and marks the data unit as last-modified. The invalidation processing at the other second-level cache clears the last-modified indicator at the other second-level cache so that the other second-level cache thereafter is aware that it does not have the most recent version of the data unit.

Still other objects and advantages of the present invention will become readily apparent to those skilled in the art from the following detailed description, wherein only the preferred embodiment of the invention is shown, simply by way of illustration of the best mode contemplate for carrying out the invention. As will be realized, the invention is capable of other and different embodiments, and its several details are capable of modification in various respects, all without departing from the invention. Accordingly, the drawings and description are to be regarded as illustrative in nature, and not as restrictive.

BRIEF DESCRIPTION OF THE DRAWINGS

FIG. 11 is a table that shows the various actions taken in processing read and write requests with the relevant possible cache related states of the requested data.

DETAILED DESCRIPTION

Figure 1:
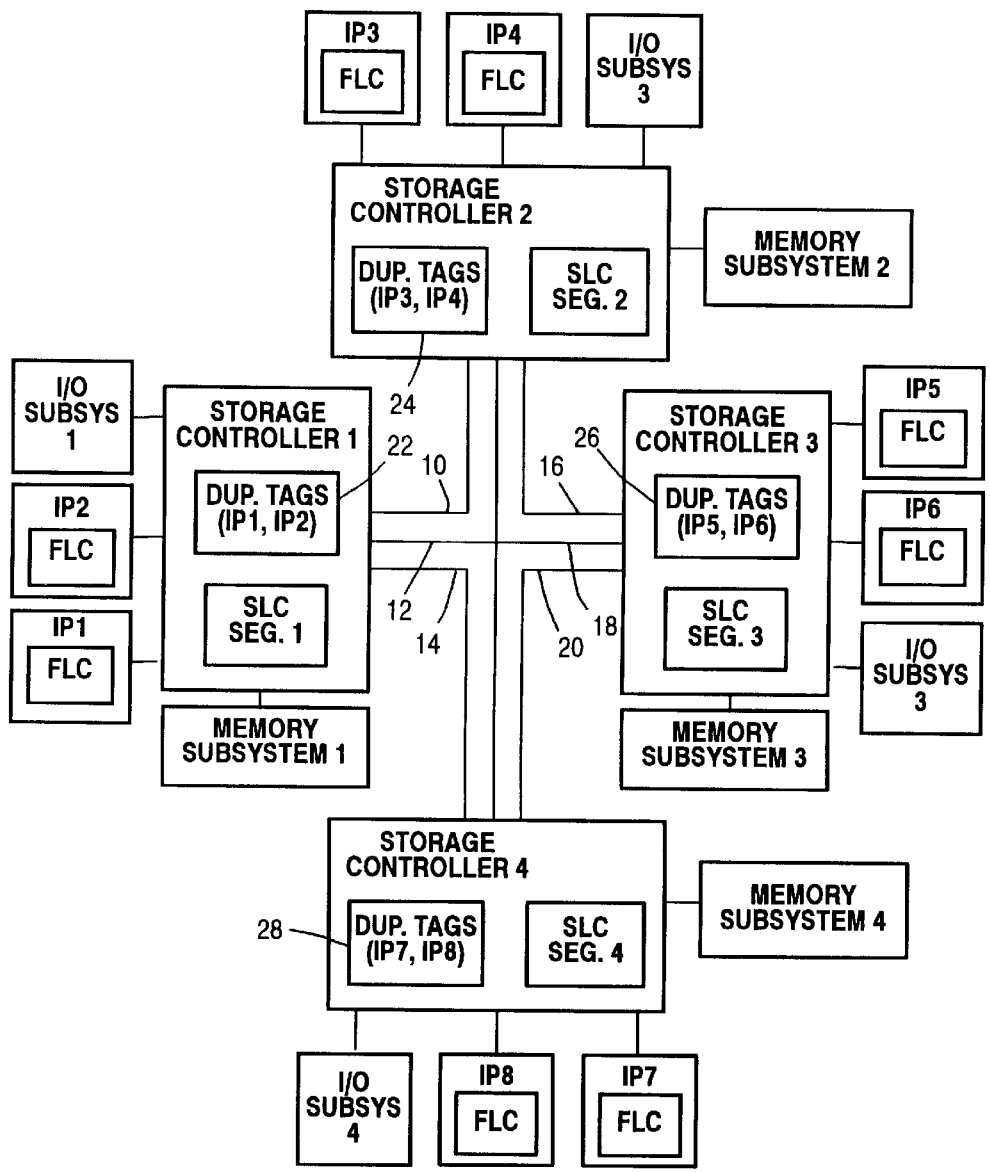
FIG. 1 is a block diagram of a prior art multiprocessor data processing system having a multi-level storage hierarchy.

FIG. 1 is a block diagram of a prior art multiprocessor data processing system having a multi-level storage hierarchy. The illustrated system is a 2200/900 Series data processing system that is commercially available from Unisys Corporation. The maximum configuration, as illustrated, includes eight instruction processors (IPs) designated IP1–IP8. Each of the IPs is directly coupled to one of the Storage Controllers (SCs). Specifically, IP1 and IP2 are coupled to SC1, IP3 and IP4 are coupled to SC2, IP5 and IP6 are coupled to SC3, and IP7 and IP8 are coupled to SC4.

Each of the Storage Controllers provides access to a directly coupled local Memory Subsystem, routes memory requests to others of the Storage Controllers, and includes a segment of the Second Level Cache (SLC). Each of the Memory Subsystems comprise one-fourth of the addressable main memory for the system. Memory Subsystem 1 is directly coupled to Storage Controller 1, Memory Subsystem 2 is directly coupled to Storage Controller 2, Memory Subsystem 3 is directly coupled to Storage Controller 3, and Memory Subsystem 4 is directly coupled to Storage Controller 4. The Storage Controllers are also directly interconnected one to another as shown by Lines 10, 12, 14, 16, 18, and 20. Lines 10, 12, 14, 16, 18, and 20 represent address, data, and control lines that interconnect the Storage Controllers.

Each of the IPs may access both its local Memory Subsystem and the remote Memory Subsystems. Relative to an individual IP, the local Memory Subsystem is that which is directly coupled to the Storage Controller to which the IP is directly coupled. For example, Memory Subsystem 1 is local to IP1 and to IP2. The remote Memory Subsystems, relative to an individual IP, are those which are directly coupled to a Storage Controller other than the Storage Controller that is directly coupled to the IP. For example, Memory Subsystem 3 is remote relative to IP1 and IP2. Access to the data of Memory Subsystem 3 by either IP1 or IP2 must be made by a remote request that is routed by Storage Controller 1 to Storage Controller 3.

Each of the IPs includes a storage-through first level cache (FLC), and the Second Level Cache (SLC) is comprised of four segments with one of the Second Level Cache segments present in a respective one of the Storage Controllers. An SLC Segment maps only to the address space of the local Memory Subsystem. An SLC Segment does not map to a remote Memory Subsystem. Specifically, SLC Segment 1 is dedicated to caching the addressable memory space of Memory Subsystem 1, SLC Segment 2 is dedicated to caching the addressable memory space of Memory Subsystem 2, SLC Segment 3 is dedicated to caching the memory space of Memory Subsystem 3, and SLC Segment 4 is dedicated to caching the memory space of Memory Subsystem 4.

The system of FIG. 1 may result in longer access times for requests made to the Second Level Cache if either the request is references a remote address or there is a high frequency of access requests for addresses of one of the Memory Subsystems. First, for example, if IP1 initiates a request to the Second Level Cache for an address within Memory Subsystem 4, a remote request must be sent to and processed by the Second Level Cache Segment 4. Data must also be returned via the remote interface, thereby adding access time. In a second example, if a hot spot develops within an address range of Memory Subsystem 2 (i.e., many of the processors addressing the same address range which is a common phenomenon in high volume transaction processing environments), the involved processors may contend for access to SLC Segment 2.

Each of the Storage Controllers 1–4 includes Duplicate Tags 22, 24, 26, and 28 for the respective directly coupled Instruction Processors. For example, Storage Controller 1 has Duplicate Tags for IP1 and IP2, and Storage Controller 3 has Duplicate Tags for IP5 and IP6. The Duplicate Tags are used as filters for invalidation requests. If an address specified in an invalidation request is not present in a Duplicate Tag, then no invalidation is required in the associated First Level Cache. On the other hand, if an address specified in an invalidation request is present in a Duplicate Tag, then invalidation is required in the associated First Level Cache. Thus, the Duplicate Tags serve to filter out invalidation requests to the First Level Caches if the address is not present.

I/O Subsystems 1–4 are directly coupled to respective ones of the Storage Controllers 1–4. I/O requests to the Storage Controllers may either read from or write to the addressable memory.

The system of FIG. 1 has a high volume of invalidation traffic and therefore requires a dedicated invalidation address interface between the Storage Controllers 1–4. The high volume of invalidation traffic also results in decreased efficiency of the Storage Controllers. All write operations from the IPs and I/O Subsystems are routed to each of the Duplicate Tags 22, 24, 26, and 28 where a search is performed. If a hit results from search, then an invalidate request is made to the associated FLCs.

The overhead involved in the cache coherency scheme of the system of FIG. 1 may be better understood by way of example. If IP1 initiates a write request to an address of Memory Subsystem 4, the write request is sent first to Storage Controller 1. The address is then sent to Storage Controller 4 using the normal address path from Storage Controller 1 to Storage Controller 4 because Storage Controller 4 and SLC Segment 4 control access to Memory Subsystem 4. The write may occur in either SLC Segment 4 or in Memory Subsystem 4, depending upon whether the address was a hit in SLC Segment 4. At the same time that the write address is routed to Storage Controller 4, it is also routed as an invalidation request to Duplicate Tags 22 and also broadcast as an invalidation request over the invalidation address lines to Storage Controller 2, Storage Controller 3, and Storage Controller 4. The Storage Controllers receiving the invalidation request present the address to their respective Duplicate Tags 24, 26, and 28. If the address has a match in the Duplicate Tag, the associated IP is then informed to invalidate the appropriate address in its FLC.

Continuing the example, the invalidation processing may be excessive and unnecessary if IP1 initiates a write request for the same address or an address within the same block of the first write request (Note that a block consists of eight words and is the level of granularity for reading units of main memory into the cache). In processing the second write request from IP1, the invalidation requests are again propagated to the other Duplicate Tags 24. 26, and 28. The invalidation traffic resulting from the second write is unnecessary if none of the other IPs obtained a valid block in their FLC after the first write by IP1 and before the second write by IP2.

The present system substantially reduces the volume of invalidation traffic, thereby enabling the invalidation address interface to be combined with the normal memory request interface and resulting in a significant reduction in logic.

Figure 2:
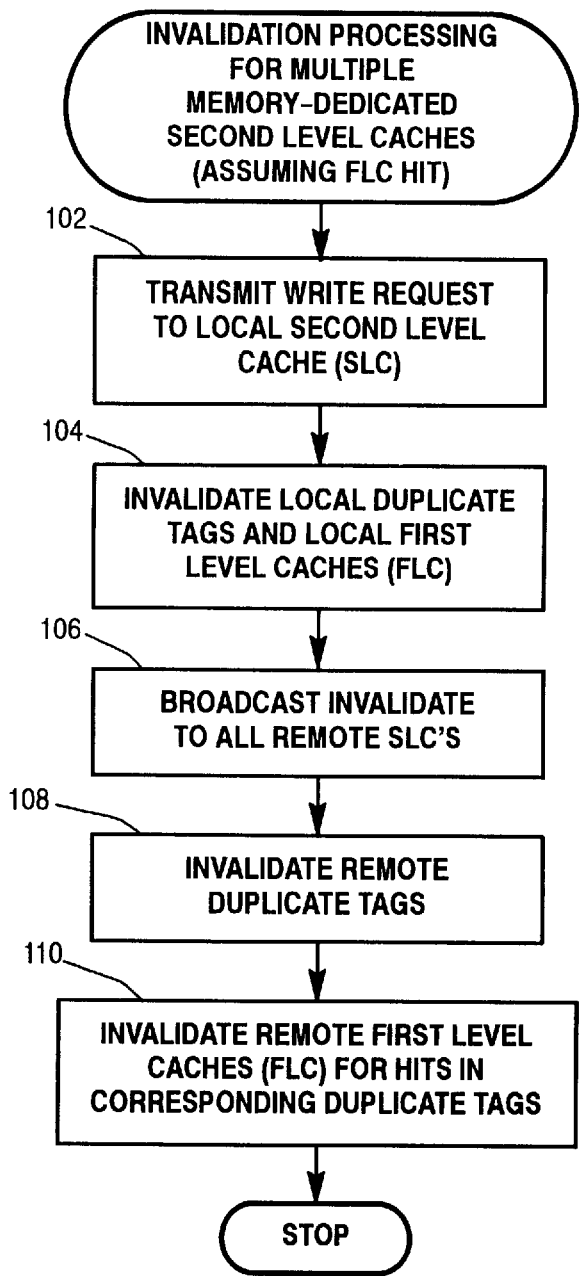
FIG. 2 is a flowchart of invalidation processing performed by the prior art system of FIG. 1.

FIG. 2 is a flowchart of invalidation processing performed by the prior art system of FIG. 1. FIG. 2 illustrates the processing that was described above in the examples set forth for FIG. 1. The processing of FIG. 2 assumes a write request initiated by an IP that resulted in a hit in the processor's FLC. Because the FLCs are store-through caches, a write request is passed from the IP to the local SLC Segment as shown by Step 102. For example, a write request is transmitted from IP1 to SLC Segment 1. Upon detecting the write request, the Second Level Cache Segment 1 initiates invalidation at the local Duplicate Tags 22 for IP1 and IP2 as shown by Step 104. If there is a hit in the Duplicate Tag for IP2, then the appropriate tag line in the IP2's FLC is invalidated. Step 106 broadcasts invalidation requests to the remote Storage Controller 2, Storage Controller 3, and Storage Controller 4. Invalidation is then initiated for the remote Duplicate Tags 24, 26, and 28 as shown by Step 108. At Step 110, if there are any hits in the remote Duplicate Tags, the corresponding entries in the tags of the remote FLCs are also invalidated.

Figure 3:
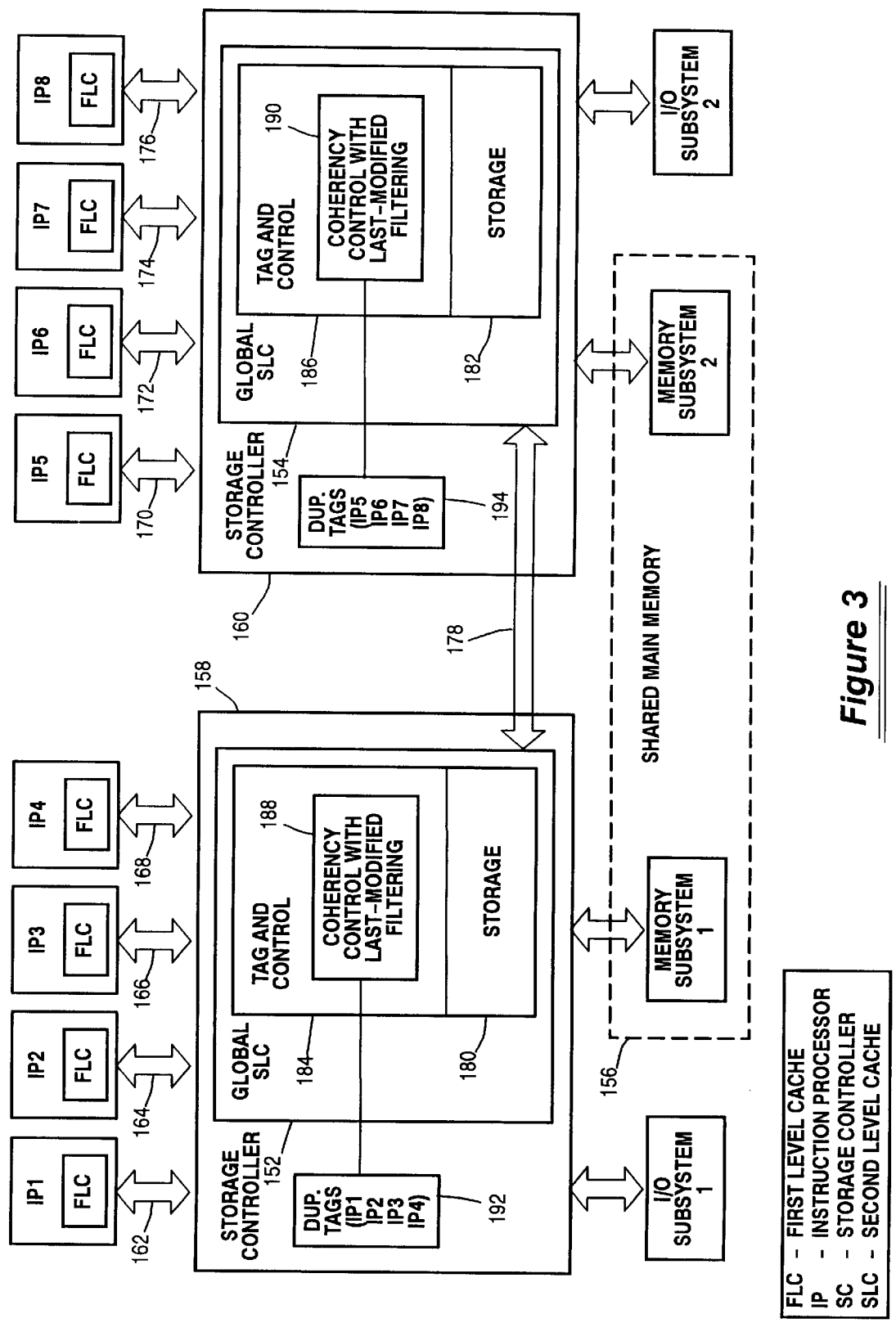
FIG. 3 is a block diagram of a multi-processor data processing system in which the present invention is embodied.

FIG. 3 is a block diagram of a multi-processor data processing system in which the present invention is embodied. In that the storage hierarchy of the system of FIG. 3 is multi-level, the storage hierarchy is similar to that of the system of FIG. 1. The system of FIG. 3 includes eight Instruction Processors, IP1, IP2, IP3, IP4, IP4, IP6, IP7, and IP8, each having a dedicated store-through First Level Cache. The system of FIG. 3 is different from that of FIG. 1 in that it includes two Global Second level Caches (SLCs) 152 and 154. The Global SLCs are described as "global" because each is mapable to the all of system's addressable memory. That is, the entire address range of the addressable memory is cacheable by each of the Global SLCs. The total available addressable memory is designated by Shared Main Memory 156. The Shared Main Memory is comprised of two Memory Subsystems, Memory Subsystem 1 and Memory Subsystem 2.

The FLCs consist of two dedicated caches, one for the instruction stream and the other for operands. Both caches are 8 k words in size and are organized as 256 sets by four blocks, where each block contains eight words. The operand cache operates as a store-through cache. If a requested write operand is not resident in the FLC, the operand is not made present in the FLC. Operand and instruction blocks are made resident in the FLC on read misses only. Copies of the FLC tags are present in the Storage Controllers 158 and 160 for maintaining cache coherency.

The system of FIG. 3 has two Storage Controllers 158 and 160, as compared to the four Storage Controllers of the system of FIG. 1. Each of Storage Controllers 158 and 160 is coupled to four IPs. Lines 162. 164, 166, and 168 illustrate the respective point-to-point couplings between the IP1, IP2, IP3, IP4 and Storage Controller 158. Lines 162, 164, 166, and 168 represent the collection of control, data, and address lines between the IPs and the Storage Controller. Lines 170, 172, 174, and 176 represent similar couplings between Storage Controller 106 and IP5, IP6, IP7, and IP8 respectively.

Global SLC 152 is coupled to Global SLC 154 in a point-to-point fashion as illustrated by Line 178. Line 178 is comprised of data, address, and control lines. Global SLC 152 may be accessed directly by IP1, IP2, IP3, and IP4, and indirectly accessed by IP5, IP6, IP7, and IP8. Similarly, Global SLC 154 may be accessed directly by IP5, IP6, IP7, and IP8, and indirectly by IP1, IP2, IP3, and IP4. If IP1 issues a read request for an address of Memory Subsystem 2 which is neither in IP1's FLC nor in Global SLC 152, the request is forwarded to Global SLC 154. If the requested address is present in Global SLC 154, the data of the requested address is returned to Global SLC 152. If the requested address is a miss in Global SLC 154, the request is forwarded to memory Subsystem 2. The data is then returned to Global SLC 152. Note that no replacement of data takes place in Global SLC 154 as a result of requests from Global SLC 152.

Storage Controller 158 and Global SLC 152 are "local" relative to IP1, IP2, IP3, IP4, and I/O Subsystem 1, and are "remote" relative to IP5, IP6, IP7, IP8, and I/O Subsystem 2. Similarly Storage controller 160 and Global SLC 154 are "local" relative to IP5, IP6, IP7, IP8, and I/O Subsystem 2, and are "remote" relative to IP1, IP2, IP3, IP4, and I/O Subsystem 1. The Global SLCs 152 and 154 may be viewed as dedicated to the requests of their respective local IPs and cooperating in servicing requests from the remote IPs. Global SLC 152 is dedicated to IP1, IP2, IP3, and IP4 in that the Storage element 180 is dedicated to caching data based on requests from IP1, IP2, IP3, and IP4. Similarly, Global SLC 154 is dedicated to IP5, IP6, IP7, and IP8 in that the Storage element 182 is dedicated to caching data based on requests from IP5, IP6, IP7, and IP8.

In addition to the Storage element 180, Global SLC 152 further includes a Tag and control element 184. The Tag and control element includes a Tag memory (not shown) and control for managing the Tag memory and the Storage element 180. Controls include cache replacement, data coherency, and access to the Storage element. Tag and control element 186 provides similar functionality for Global SLC 154.

Coherency Control element 188 in conjunction with Coherency Control element 190 coordinate data coherency of the FLCs and Global SLCs 152 and 154. Coherency Control element 188 is coupled to the Duplicate Tags for IP1, IP2, IP3, and IP4 (shown as block 192), and Coherency Control element 190 is coupled to Duplicate Tags for IP5, IP6, IP7 and IP8 (shown as block 194).

Coherency Control elements 188 and 190 include last-modified filtering for efficiently maintaining cache coherency between the FLCs and Global SLCs 152 and 154. The way in which the last-modified filtering works is illustrated by the following example. Assume that there is data that is present and was last modified in Global SLC 154 (i.e., Global SLC 154 contains the most up-to-date version of the data). Next, IP1 issues a write request to Storage Controller 158. Global SLC 152 will check its Tag 184 and find that it does not have a copy and was not the last to modify the data, and at the same time, Duplicate Tags 192 for IP1, IP2, IP3, and IP4 are searched and any hits will result in an invalidate request to be forwarded to the corresponding IPs. Global SLC 152 will then send the requested address to Global SLC 154. The transfer serves two purposes. First, to address the remote Global SLC 154 and obtain the requested block to be modified, and second, to invalidate both the Tag 186 of Global SLC 154 and the Duplicate Tags 194 for IP5, IP6, IP7, and IP8. Once the data is transferred back to Global SLC 152, it is modified, stored in Storage 180 and marked as last-modified by Global SLC 152. This means that the block of data was invalidated in Global SLC 154. Therefore, future write operations by any of IP1, IP2, IP3, IP4, or I/O Subsystem 1 to that block of data, do not need to be transferred to Global SLC 154 to invalidate Tag 186 and Duplicate Tags 194. This is how the invalidation requests are filtered by the last-modified control.

Figure 4:
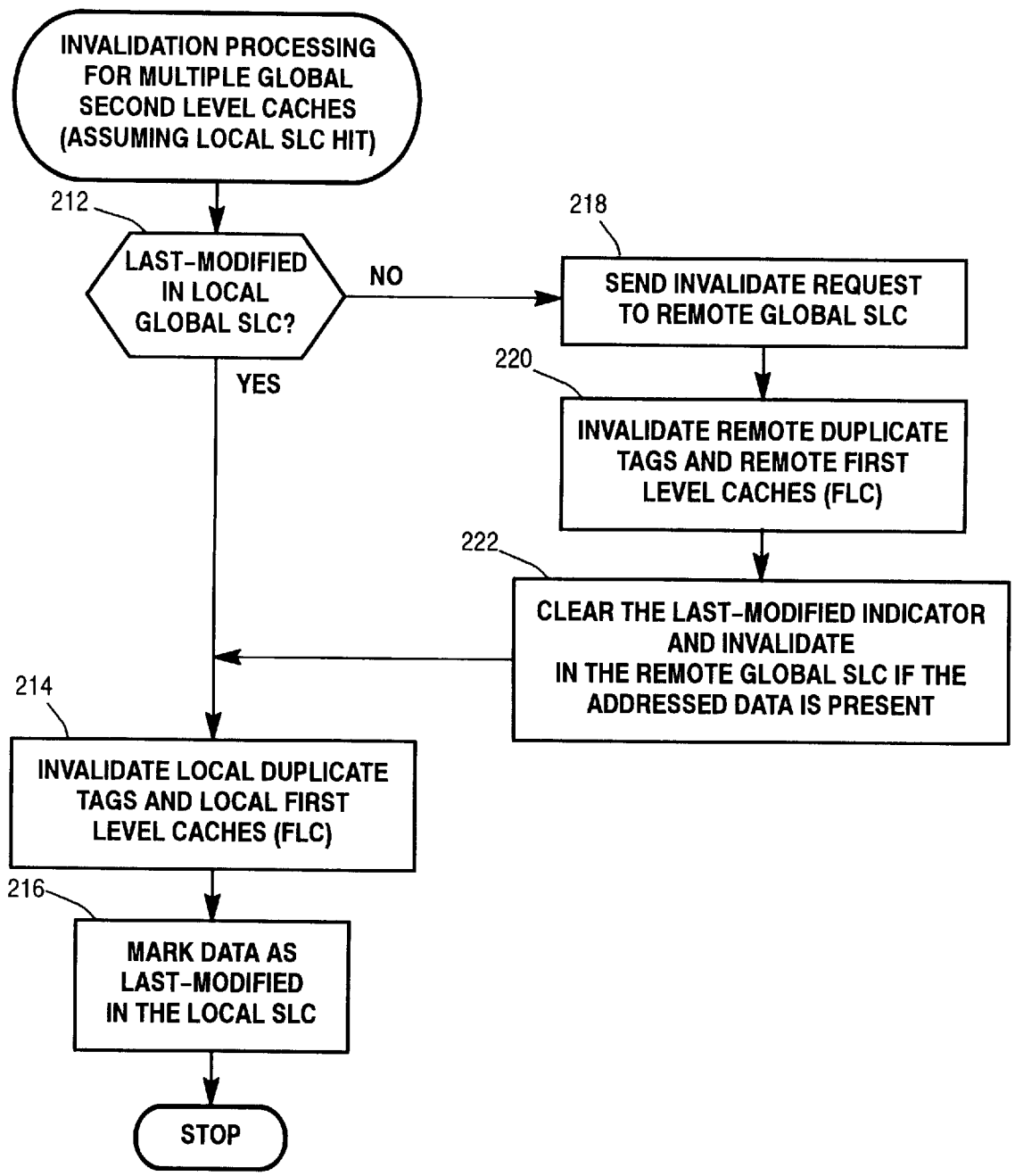
FIG. 4 is a flowchart that shows the processing benefits achieved by using the last-modified control for filtering invalidation requests for maintaining cache coherency in the context of the system of FIG. 3.

FIG. 4 is a flowchart that shows the processing benefits achieved by using the last-modified control for filtering invalidation requests for maintaining cache coherency in the context of the system of FIG. 3. The flowchart of FIG. 4 may be compared to the processing steps of the flowchart of FIG. 2 to illustrate the benefits of the filtering as performed by the present invention.

The processing assumes that an IP issued a write request to its local Global SLC, for example, IP1 to Global SLC 152 and that the operand to be written to was present in the local Global SLC. The first Step 212 is to test whether the address was last modified in the local SLC. If the data was last modified in the local SLC, then control is directed to Step 214. Step 214 sends invalidation requests to the local Duplicate Tags (Dup. Tags 192 for example), and if the address to be invalidated is present in any of the Duplicate Tags, the corresponding entries are invalidated and the appropriate entries in the FLC tags are invalidated. Finally, at Step 216, the address to which the write was performed is designated as last-modified in the local Global SLC (152 for example).

The processing that is saved is shown by Steps 218, 220, and 222. By tracking which Global SLC 152 or 154 has the most recent version of the cached data, the invalidation traffic is significantly reduced. If the local Global SLC has the most recent version of the data at the address to be written to, it is known that the remote Global SLC Tag and the remote Duplicate Tags have already been invalidated and that no further invalidation is necessary. Otherwise, the data must be invalidated in the remote Global SLC and remote Duplicate Tags.

If the address of the write request was not last-modified in the local Global SLC, an invalidation request is sent to the remote Global SLC as shown by Step 218 (Note that for the purpose of this flowchart a write-miss is ignored). The remote Global SLC forwards the invalidation request to the remote Duplicate Tags which in turn perform any necessary invalidation. If the address of the invalidation request is present in a Duplicate Tag, the invalidation request is forwarded to the FLC of the appropriate IP as shown by Step 220. Step 222 clears the last-modified indicator and invalidates the address of the invalidation request in the Tag of the Global SLC if the address of the invalidation request is present in the Global SLC's Tag.

Figure 5:
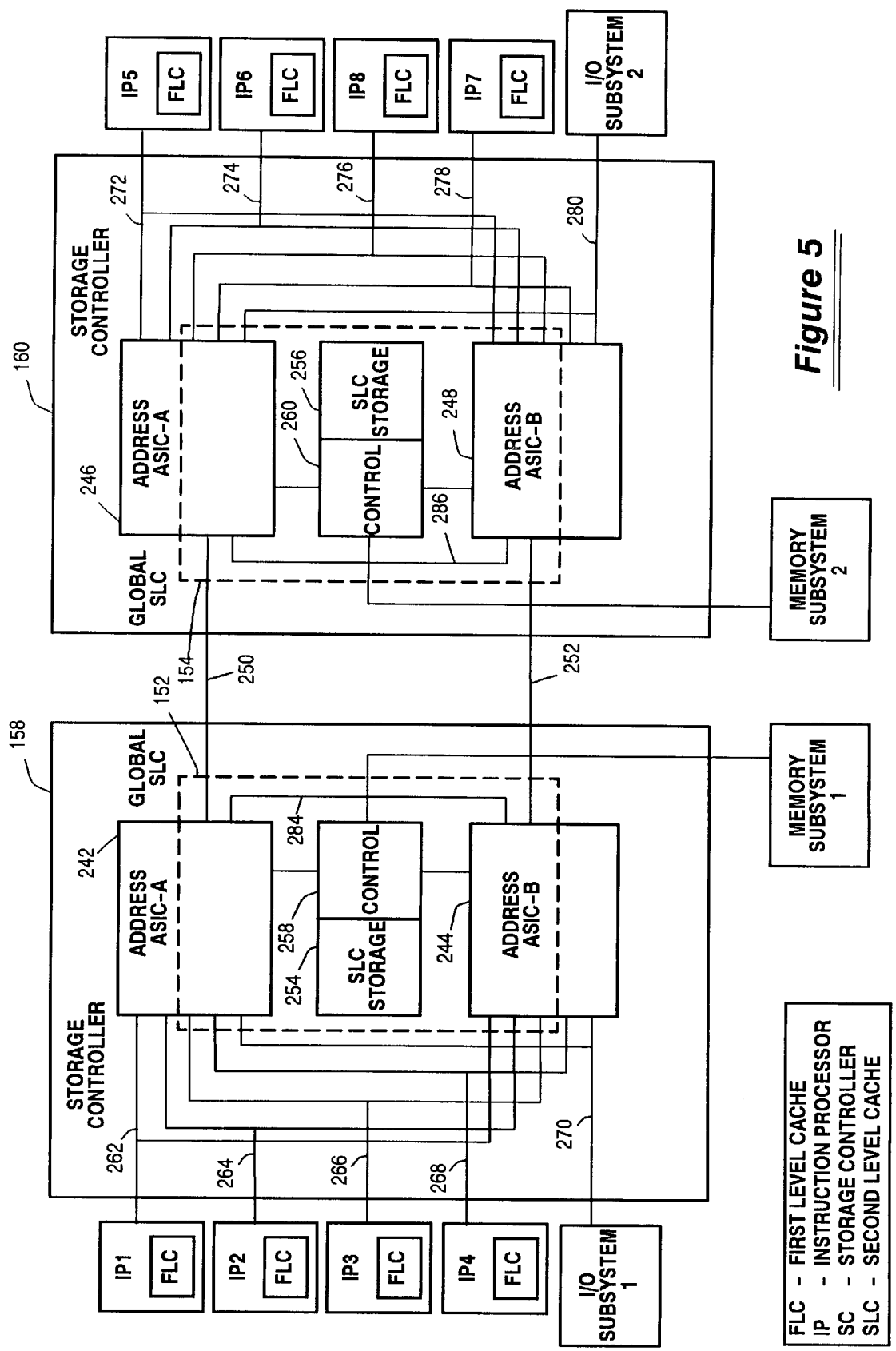
FIG. 5 is a more detailed block diagram of the storage controls and interconnections between the components of the Storage Controllers.

FIG. 5 is a more detailed block diagram of the storage controls and interconnections between the components of the Storage Controllers 158 and 160. Each of the Storage Controllers has two Address ASICs, Address ASIC-A and Address ASIC-B. Address ASIC-A 242 of Storage Controller 158 is directly coupled to Address ASIC-A 246 of Storage Controller 160 via Line 250. Similarly Address ASIC-B 244 is directly coupled to Address ASIC-B 248 via Line 252. Lines 250 and 252 are comprised of unidirectional data, address, and control lines.

For the respective Global SLCs 152 and 154, each of the Address ASICs 242, 244, 246, and 248 contain a Tag for ½ of the addressable memory space provided by Memory Subsystem 1 and Memory Subsystem 2. Specifically, Address ASIC-A 242 contains control and a tag for managing ½ of the system's addressable memory for caching in SLC Storage 254, and Address ASIC-B 244 contains control and a tag for managing the other half of the system's addressable memory for caching in SLC Storage 254. Address ASIC-A 246 and Address ASIC-B 248 perform similar function with respect to SLC Storage 256. Address ASIC-A 242 and Address ASIC-B 244 gain access to SLC Storage 254 via Control element 258. Control element 260 provides access to SLC Storage 256 for Interfaces 246 and 248.

Address ASIC-A 242 and Address ASIC-B 244 are directly coupled to IP1, IP2, IP3, IP4, and I/O Subsystem 1 as is respectively shown by Lines 262, 264, 266, 268, and 270. Lines 262, 264, 266, 268 and 270 include unidirectional address, data, and control lines. Address ASIC-A includes Duplicate Tags (not shown) for IP1's FLC and for IP2's FLC, and Address ASIC-B includes Duplicate Tags (not shown) for IP3's FLC and for IP4's FLC. IP5, IP6, IP7, IP8, and I/O Subsystem 2 are directly coupled to Address ASIC-A 246 and Address ASIC-B 248 in a similar manner as shown by Lines 272, 274, 276, 278, and 280. Address ASIC-A 246 contains Duplicate Tags (not shown) for IP5's FLC and for IP6's FLC, and Address ASIC-B 248 contains Duplicate Tags (not shown) for IP7's FLC and for IP8's FLC.

Address ASIC-A 242 is directly coupled to Address ASIC-B 244 via Line 284. Line 284 is comprised of unidirectional control lines that provide for transmission of invalidation requests to be processed against the Duplicate Tags that are respectively included in each of Address ASIC-A and Address ASIC-B. Line 286 is a similar coupling between Address ASIC-A 246 and Address ASIC-B 248.

Figure 6A:
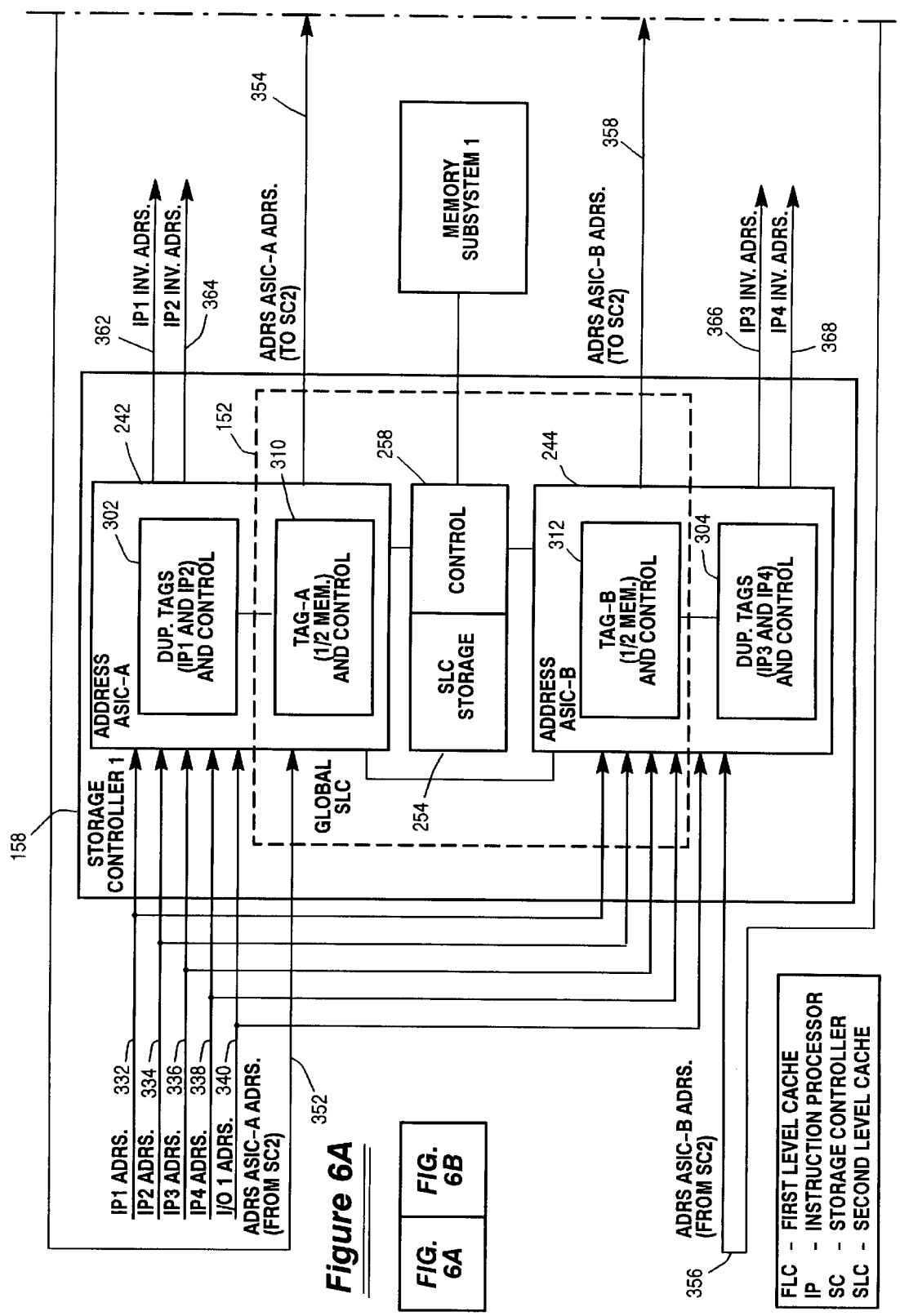
FIG. 6 shows the relationship between FIGS. 6A and 6B which together illustrate the routing of addresses within the system in which the present invention is implemented.

FIG. 6 shows the relationship between FIGS. 6A and 6B which together illustrate the routing of addresses within the system in which the present invention is implemented. In the illustrated system, each Address ASIC is a separate application specific integrated circuit (ASIC). Address ASIC-A 242 includes Duplicate Tags 302 for the FLCs of IP1 and IP2, and Address ASIC-B includes Duplicate Tags 304 for the FLCs of IP3 and IP4. Similarly, Address ASIC-A 246 includes Duplicate Tags 306 for the FLCs of IP5 and IP6, and Address ASIC-B 248 includes the Duplicate Tags 308 for IP7 and IP8.

The Global SLC functionality is split between Address ASIC-A and Address ASIC-B. Specifically, for Global SLC 152, Tag-A 310 for the Global SLC is included in Address ASIC-A 242, and Tag-B 312 is included in Address ASIC-B 244. And for Global SLC 154, Tag-A 314 is included in Address ASIC-A 246, and Tag-B 316 is included in Address ASIC-B 248. Tag-A 310 includes tag memory and control for caching ½ of the system's address space using SLC Storage 254, and Tag-B 312 includes tag memory and control for caching the other half of the address space using SLC Storage 254. Tag-A 314 and Tag-B 316 are similar with respect to SLC Storage 260.

As a whole, the SLC Tag is a 4-way set associative Tag (four blocks per set address). The Tag RAM is used to store address bits (21–40) for the data available in the SLC Storage 254 or 260. Three 1K×40 bit RAMs are used so there are 1K set addresses with 4 blocks at each set address. Each block holds an address for 8 words, a Valid bit, a Last-modified bit, a Written Bit, and 6 ECC bits associated with the block. Aging and degradation information for the block is stored in separate RAMs.

Note that all addresses from local requesters (IPs and I/O Subsystems) are routed to both Address ASICs (242 and 244, or 246 and 248) within a Storage Controller 158 or 160. Lines 332, 334, 336, 338, and 340 illustrate the address lines from the local requesters (IP1, IP2, IP3, IP4, and I/O Subsystem 1) to Address ASIC-A 242 and Address ASIC-B 244. Lines 342, 344, 346, 348, and 350 illustrate the address lines from the local requesters (IP5, IP6, IP7, IP8, and I/O Subsystem 2) to the Address ASIC-A 246 and Address ASIC-B 248.

Addresses from remote requesters are routed to only one of the Address ASICs. Line 352 is the address line for a remote request from Address ASIC-A 246 to Address ASIC-A 242, and Line 354 is the address line for a remote request from Address ASIC-A 242 to Address ASIC-A 246. Lines 356 and 358 are similar with respect to Address ASIC-B 244 and Address ASIC-B 248.

The Duplicate Tags initiate invalidation requests to their respective IPs when appropriate. Duplicate Tag element 302 routes invalidation requests to IP1 and IP2 as shown by Lines 362 and 364, and Duplicate Tag element 304 routes invalidation requests to IP3 and IP4 as shown by Lines 366 and 368. Lines 372, 374, 376, and 378 are analogous with respect to Duplicate Tag elements 306 and 308 and IP5, IP6, IP7, and IP8.

Figure 7A:
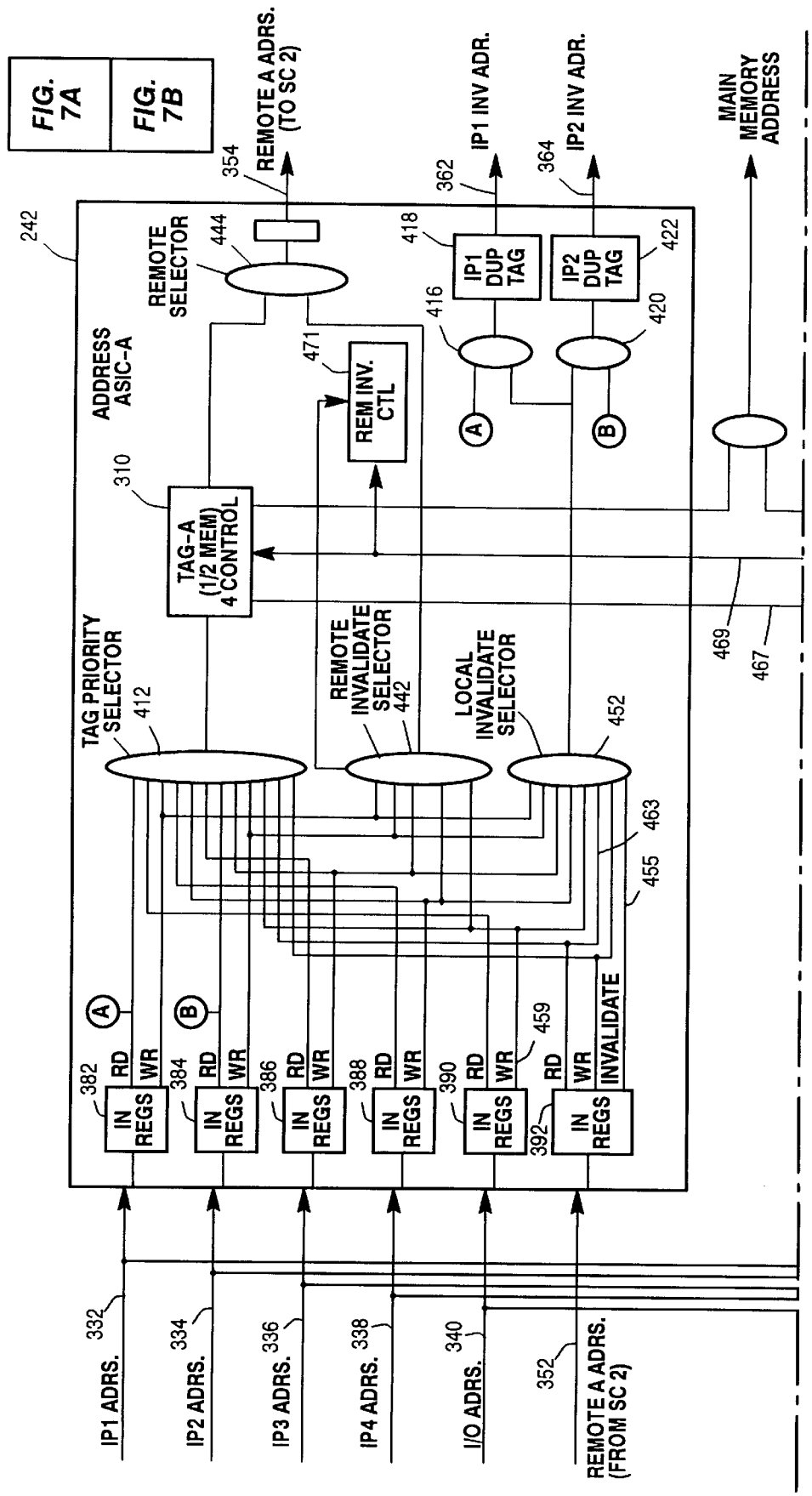
FIG. 7 is a block diagram that shows how the addresses are routed in the system in which the present invention is implemented.
Figure 7B:
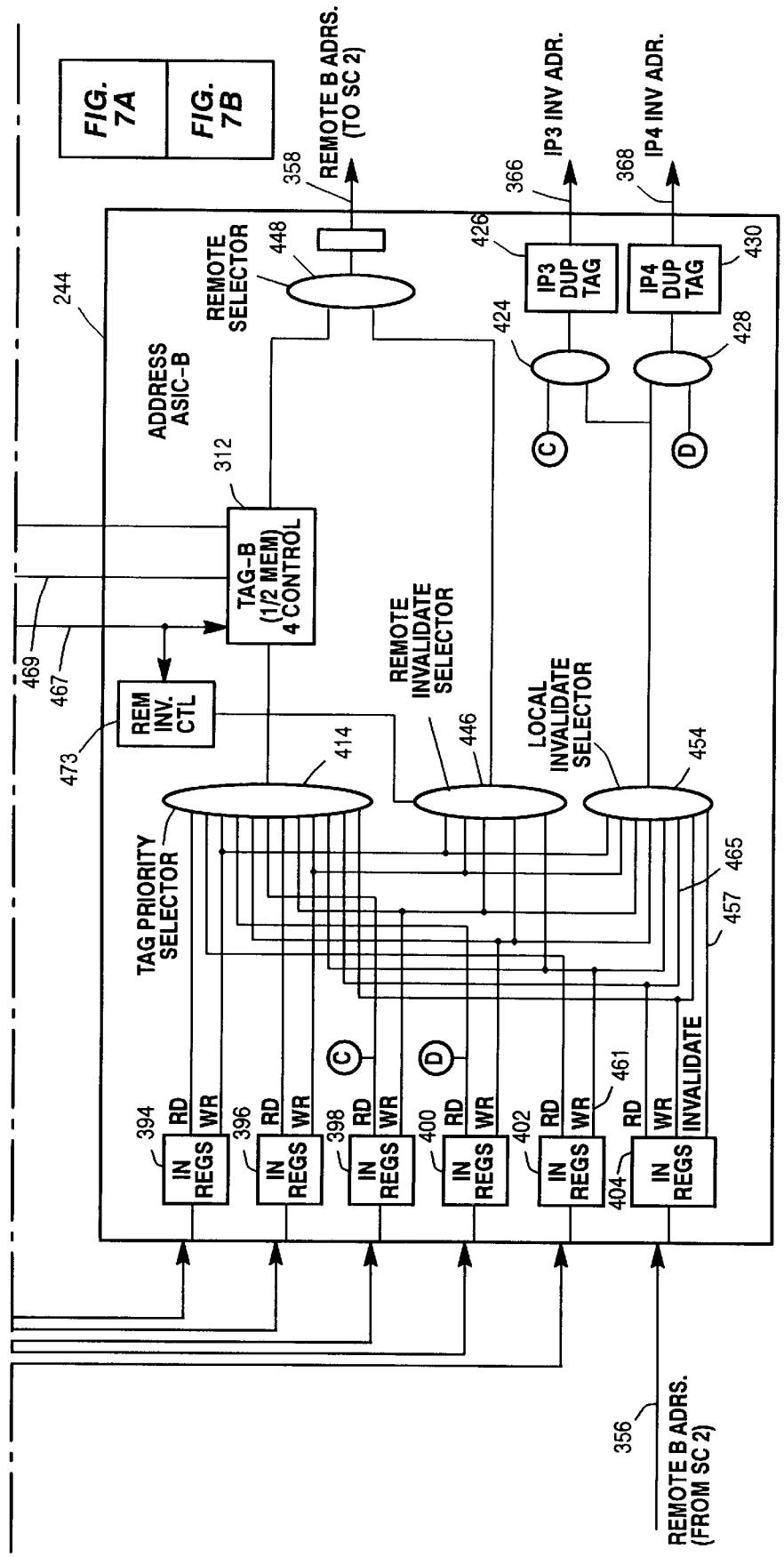

FIG. 7 is a block diagram that shows how the addresses are routed in the system in which the present invention is implemented. Each Address ASIC-A 242 and Address ASIC-B 244 includes a set of input registers for each requester. Each set of input registers includes an individual register for read requests and an individual register for write requests. In Address ASIC-A 242, Input Registers 382 receive requests from IP1, Input Registers 384 receive requests from IP2. Input Registers 386 receive requests from IP3, Input Registers 388 receive requests from IP4, Input Registers 390 receive requests from I/O Subsystem 1, and Input Registers 392 receive requests from Address ASIC-A 246. In Address ASIC-B 244, Input Registers 394 receive requests from IP1, Input Registers 396 receive requests from IP2, Input Registers 398 receive requests from IP3, Input Registers 400 receive requests from IP4, Input Registers 402 receive requests from I/O Subsystem 1, and Input Registers 404 receive requests from Address ASIC-B 248.

In processing a read request from an IP, the address is latched in both read Input Registers of the Address ASIC 242 and 244. The address is then routed to the SLC Tag 310 or 312 that is dedicated to ½ address range of the read request, via Tag Priority Selector 412 or 414 to determine whether the requested address is in SLC Storage 254. If a miss results, the address is routed to the remote Storage Controller 160 via the remote address path 354 or 358. At approximately the same time the address is also routed to the particular Duplicate Tag associated with the IP making the request where a validation cycle takes place for updating the Duplicate Tag with the new address. Input Line A to Selector 416 shows the routing of the read address to the Duplicate Tag 418 for IP1 and Input Line B to Selector 420 shows the routing of the read address to the Duplicate Tag 422 for IP2. Selectors 416 and 420 select between validating and invalidating addresses in the respective Duplicate Tags. Validation requests, which are associated with IP read-misses have priority over invalidate requests. Selectors 424 and 428 and Duplicate Tags 426 and 430 function similarly with respect to IP3 and IP4.

If an IP or and I/O Subsystem issues a write request, the address is latched in the appropriate write Input Registers (382–390 and 394–402) of both Address ASIC-A 242 and Address ASIC-B 244. The address is then routed to the SLC Tag 310 or 312 that represents the ½ address range that the write request references via the Tag Priority Selector 412 or 414 to determine whether the requested address is in SLC Storage 254. The SLC Tag checks whether it contains the last version of the data. If so, the write is complete and the write Input Registers are released. However, if the SLC Tag does not have the most recent version of the data, the write request is routed to the corresponding Address ASIC 246 or 248 of the remote Storage Controller 160.

There are separate remote Storage Controller to Storage Controller interfaces between Address ASICs-A 242 and 246, and between Address ASICs-B 244 and 248. Each interface has its own set of address, data, and control lines, as well as queue control as illustrated by Remote Selectors 444 and 448. The Remote Selectors 444 and 448 are responsible for selecting an address to transmit to the remote Storage Controller. Addresses are transmitted to the remote Storage Control in the following situations:

A storage lock request.

A read operation from a local requester that is a miss in the local second-level cache.

A 1–7 word write operation from a local requester that is either misses in the local second-level cache or where the local second-level cache does not have the last-modified version of the block.

An 8 word write operation from a local requester where the write is to either the local memory subsystem or the remote memory subsystem. In a local write operation, the request is treated as an invalidate request with an address only, and in a remote write operation, the routing of the data to the remote Storage Controller must be synchronized with the address.

Data to be flushed from the local second-level cache to the remote memory subsystem.

An invalidate search of IP Duplicate Tags.

The types of requests that are to be routed to the remote Storage Controller are classified into five general types: flush requests, remote invalidate requests, lock requests, read requests, and write requests. The general priority for selecting a request to send to the remote Storage Controller is from highest to lowest, flush requests, remote invalidate requests, lock requests, read requests from the I/O write requests from the I/O, read requests from the IPs, and write requests from the IPs.

The flush requests have highest priority because the routing of the data from the SLC Storage 254 needs to be synchronized with the routing of the address and additional staging time is required.

The remote invalidate requests are requests that cause invalidation in the remote Duplicate Tags, for example, 194. When a local requester initiates a write operation for an address that was not last-modified by the local Second-level Cache, for example, 152, all the Duplicate Tags 192 and 194 in the system must be searched. The remote invalidate request is used to pass the address from the local Second-level Cache to the remote Second-level Cache to obtain access to the remote Duplicate Tags.

As an example, if a partial-block write request (a write of fewer than 8 words) on Line 332 from IP1 results in a miss in the Second-level Cache 152, or the data was not last-modified in Second-level Cache 152, the address must be routed to Address ASIC-A 246. The request is routed from Tag-A 310 to interface Line 354 via the remote Selector 444. Address ASIC-A 246 then receives a read request in its remote In-Regs (corresponding to In-Regs 392 of the local Address ASIC-A 242) because the write-miss in the local second-level cache results in a read to the remote second-level cache. This is done to check whether the remote Second-level Cache 154 has the last-modified version of the data. If remote Second-level Cache 154 has the last-modified version of the data, the data is transferred back to Second-level Cache 152 and the new data from IP1 is merged in with the data from Second-level Cache 154. At the same time, the remote Tag-A 314 is invalidated, and the remote Duplicate Tags 306 for IP5 and IP6 are searched. The Local Invalidate Selector (corresponding to 452 in the local Address ASIC-A) in the remote Address ASIC-A selects the read address from the remote interface for routing to the remote Duplicate Tags 306. If there is match in Duplicate Tags 306, the corresponding first-level cache in IP5 or IP6 is invalidated.

Continuing with the example, after the address is routed to the remote Address ASIC-A 246, a Route Remote bit-code is sent from the local Address ASIC-A 242 to the local Address ASIC-B 244 to direct the Remote Invalidate Selector 446 to select the write address from the input Registers 394 of IP1. The address is used in an invalidate request and routed to the Remote Selector 448. The Remote Selector 448 (and 444 for Address ASIC-A) prioritizes normal read and write requests with invalidate requests to the remote Storage Controller 160. The invalidate request is routed via interface Line 358 to the remote Address ASIC-B 248. The remote Local Invalidate Selector then prioritizes the invalidate request made available on the Invalidate Line (corresponding to 457 in the local Address ASIC-B 244) with other local write invalidate requests in the other Input Registers (corresponding to 394, 396, 398, 400, and 402 in local Address ASIC-B 244). The selected invalidate request is routed to the Duplicate Tags 308 for IP7 and IP8.

The priority for Local Invalidate Selectors 452 and 454 are from highest to lowest, remote invalidate requests (as is respectively shown by Lines 455 and 457), local I/O invalidate requests (as made available on the write address Lines 459 and 461), remote read invalidate requests (as made available on address Lines 463 and 465), and local IP invalidate requests with IP1 and IP5 respectively being the highest and IP4 and IP8 respectively being the lowest (as made available on the write address lines from the IP Input Registers 382, 384, 386, 388, 394, 396, 398, and 400).

Lines 467 and 469 carry control signals between Tag-A 310 and Tag-B 312. One of the bit-codes carried on Lines 467 and 469 is used to select an address by the respective Remote Invalidate Selectors 442 and 446. The Route Remote Invalidate bit-code is defined as follows:

| Bits | Description |
| --- | --- |
| 000 | Route IPa write address |
| 001 | Route IPb write address |
| 010 | Route IPc write address |
| 011 | Route IPd write address |
| 100 | Route I/O write address |
| 101 | Not used |
| 110 | Not used |
| 111 | Idle |

The Remote Invalidate Control logic elements 471 and 473 respectively receive the Route Remote Invalidate bit-codes on Lines 467 and 469, and respectively control Selectors 442 and 446 to route the indicated address to route to the respective Remote Selectors 444 and 448.

Figure 8A:
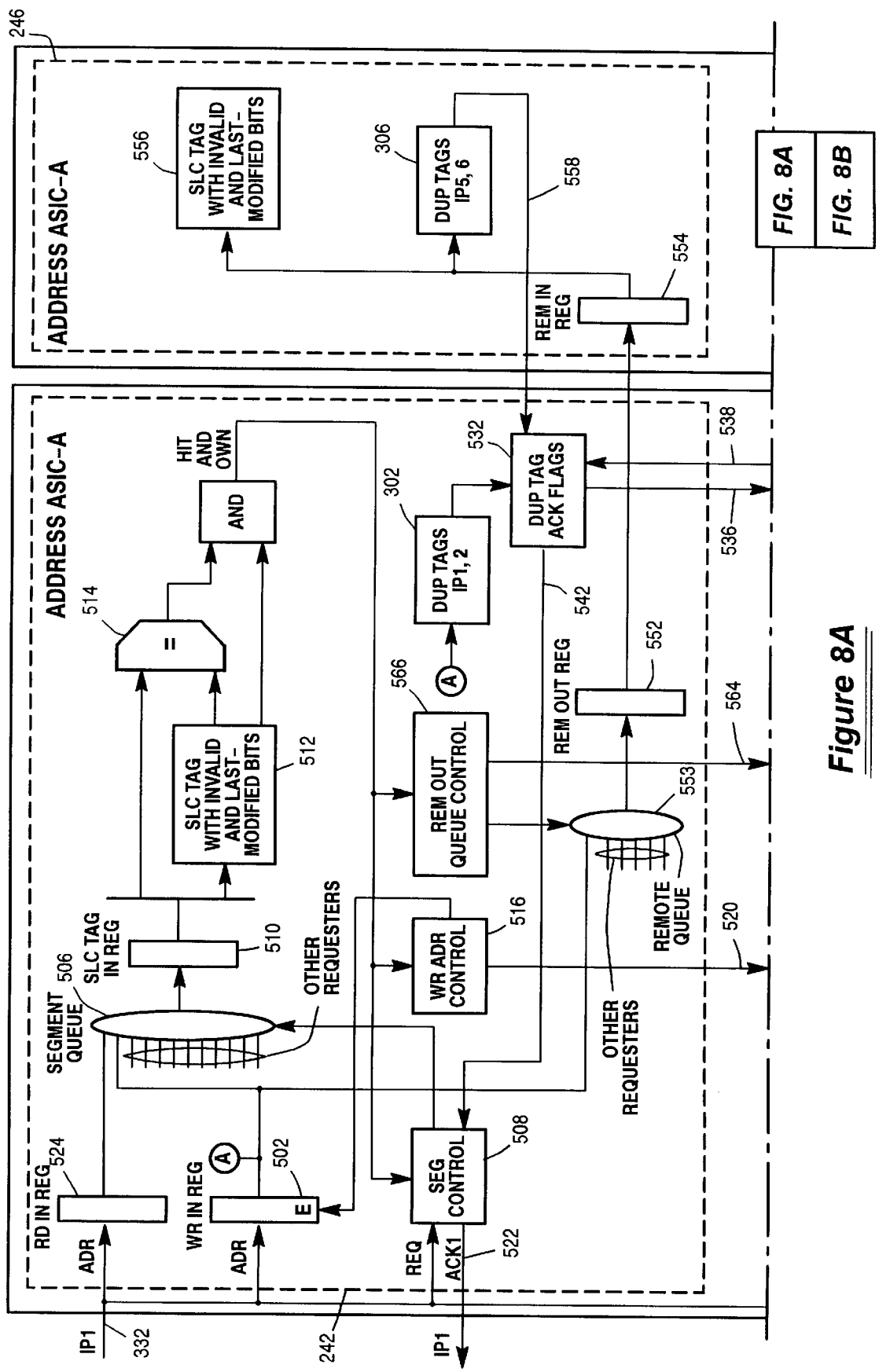
FIG. 8 is a block diagram that shows the details of the control and addressing mechanism for maintaining cache coherency.
Figure 8B:
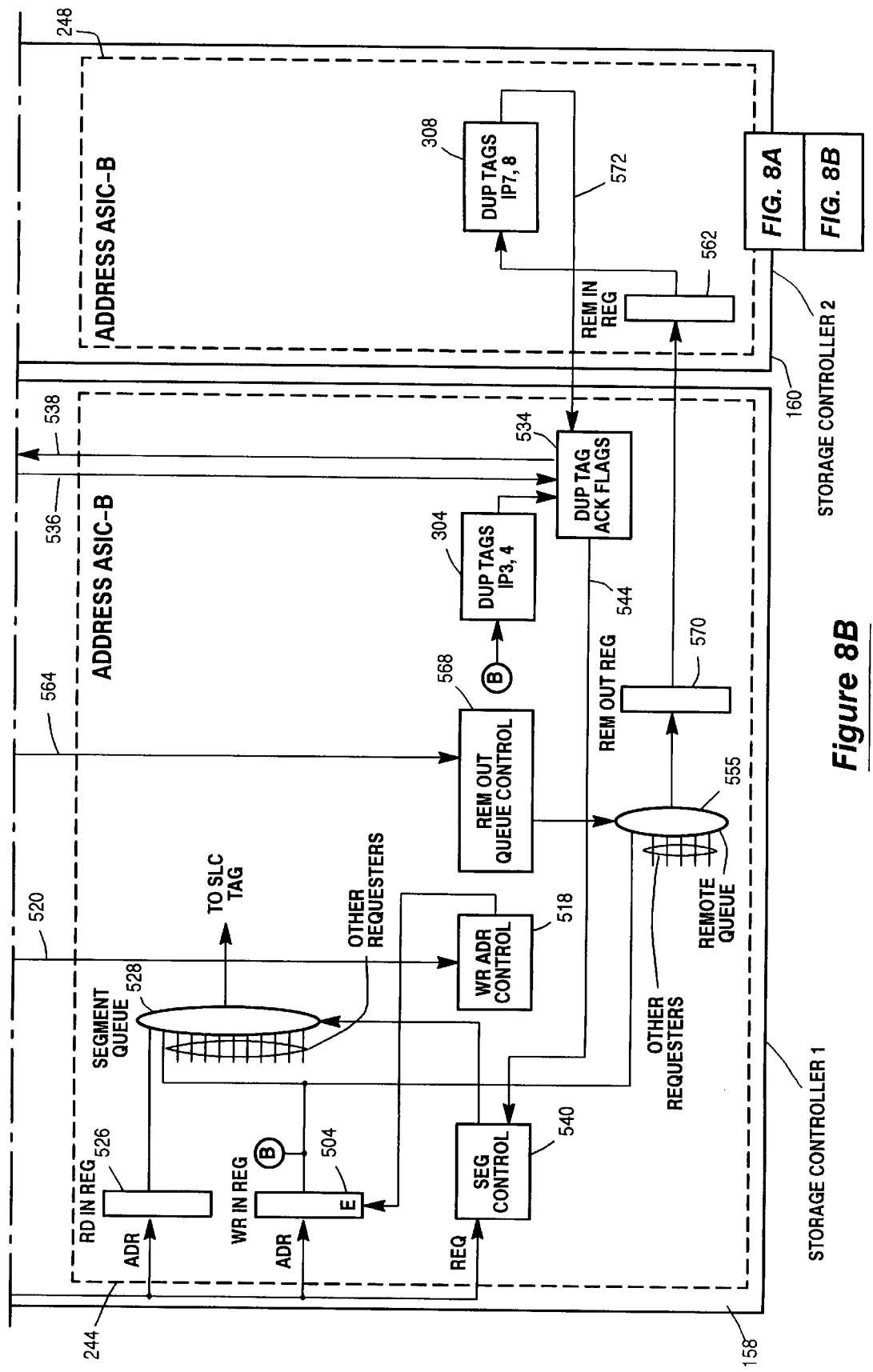
Figure 9:
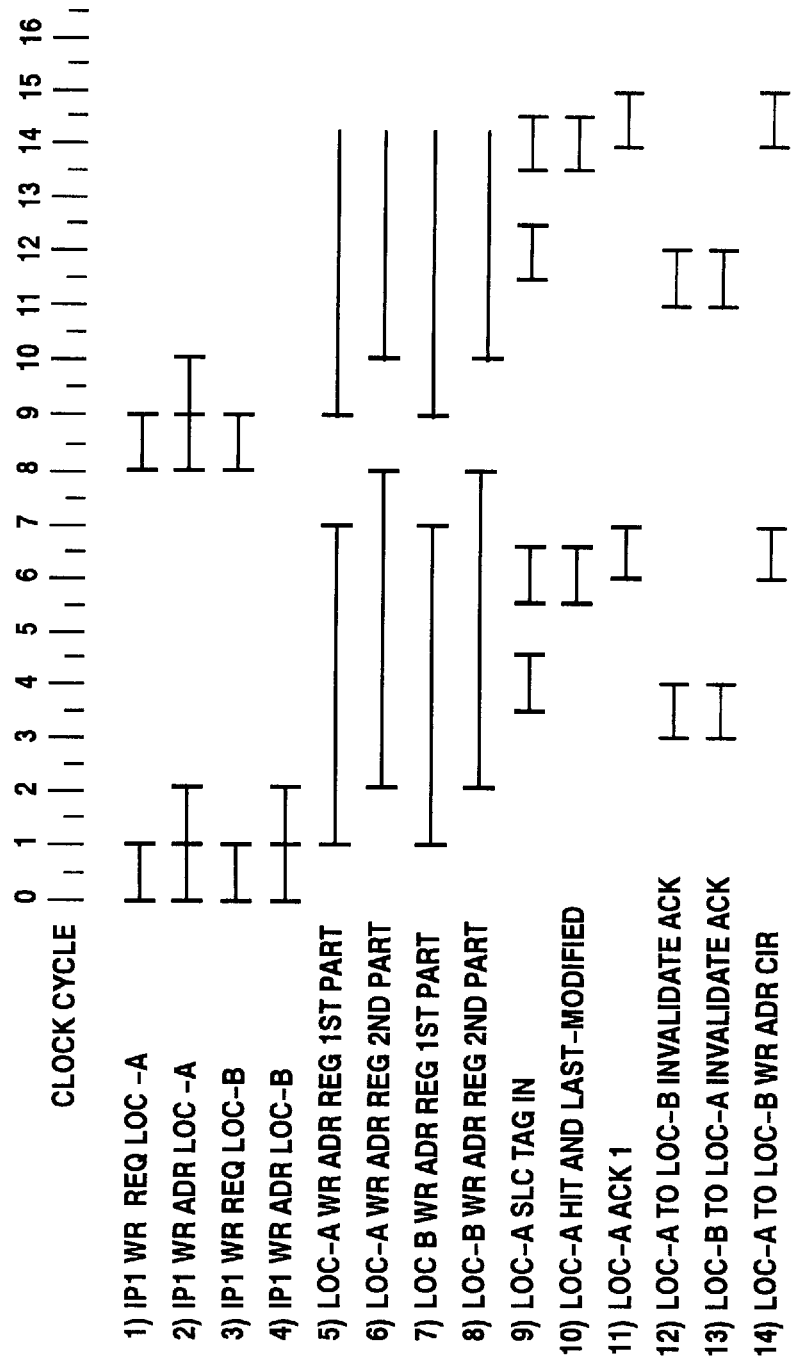
FIG. 9 is a timing diagram that illustrates how cache coherency is maintained when a Global SLC has the last modified version of the requested data.
Figure 10:
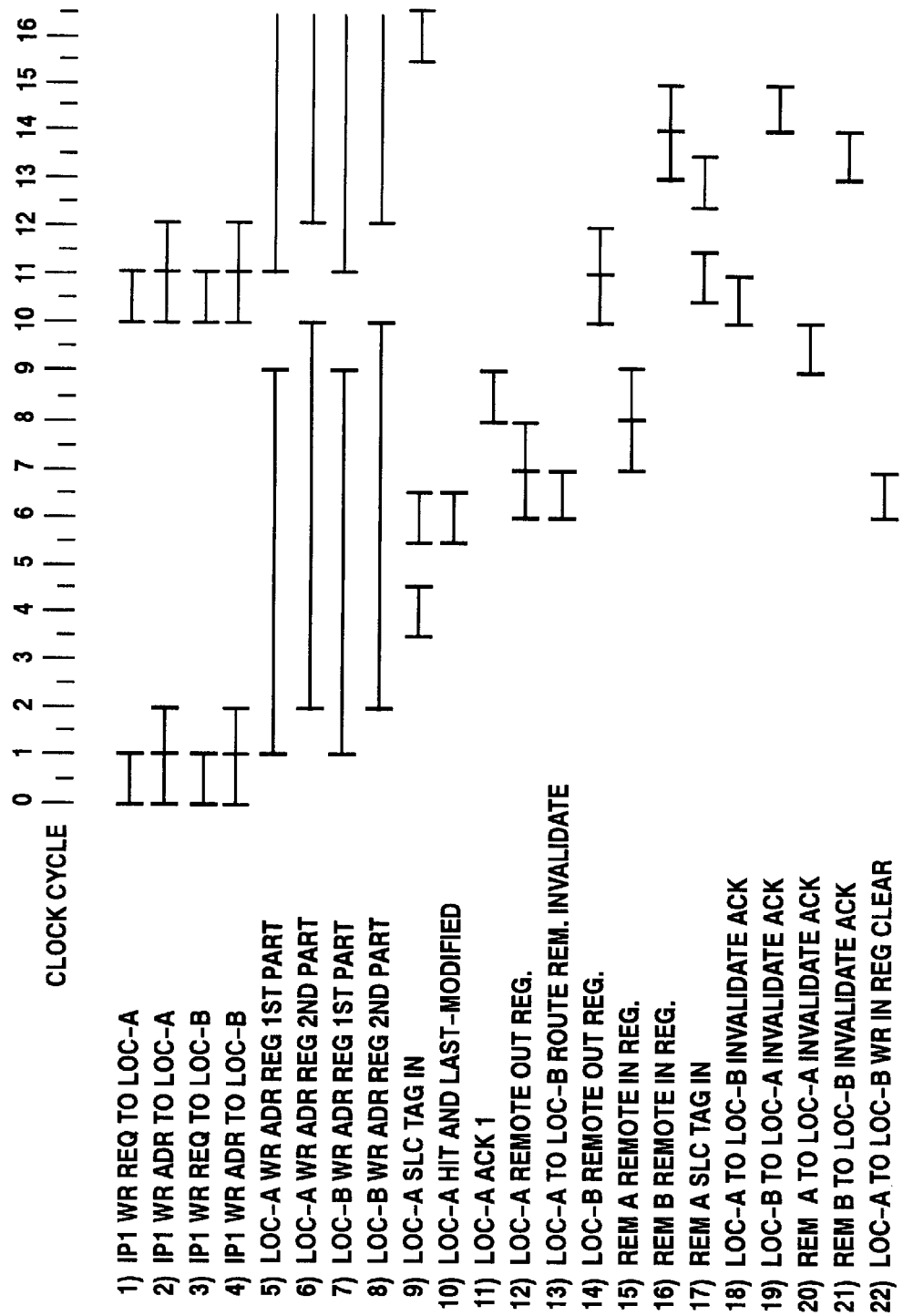
FIG. 10 is a timing diagram that illustrates how cache coherency is maintained when a Global SLC does not have the last modified version of the requested data.

FIG. 8 is a block diagram that shows the details of the control and addressing mechanism for maintaining cache coherency. FIG. 9 is a timing diagram that illustrates how cache coherency is maintained when a Global SLC has the last modified version of the requested data. FIG. 10 is a timing diagram that illustrates how cache coherency is maintained when a Global SLC does not have the last modified version of the requested data. With respect to the timing diagrams, it should be noted that the system uses a two phase clock. The higher tic marks in the clock signal reference line in the timing diagrams represent phase one and the shorter tic marks represent phase two. Transfer of information from one component to another in the system occurs on a minor cycle basis, which is basically the time interval from phase one to the next phase one, or essentially two phases. Two transfers of information are required for a full address packet when transmitting from one component to another (e.g., between an IP and SC, or between two SCs).

With reference to FIG. 8, if IP1 initiates a write request to an address within the range of control of Address ASIC-A 242, the address is transmitted to both Address ASIC-A 242 and Address ASIC-B 244. This is represented by lines 1–4 of both of FIGS. 9 and 10. Address ASIC-A 242 and Address ASIC-B 244 both have Write Input Registers respectively designated as 502 and 504. The Write Input Registers 502 and 504 are constantly clocked. Each of the registers consists of two parts: the first captures the address information on the even cycle, and the second captures the address information on the odd cycle. When a request is received, both sets of address registers are latched up and held as indicated by lines 5–8 of the timing diagrams of FIGS. 9 and 10.

The address is routed through the Segment Queue 506 by the Segment Control logic 508. The Segment Control samples all the requests from the different requesters and arranges all the local requests to be handled in a first-in-first-out (FIFO) priority scheme. When it is time for the write request to be serviced, it is routed to the SLC Tag Input Register 510 on phase 2 of cycle 3. The timing diagrams show the write address passing through the SLC Tag 512 twice, the second time belong cycle 5 phase 2.

Comparitor 514 compares the addresses stored in the set associative Tag 512 with the write address as shown in Line 10 of the timing diagram of FIG. 9. If one of the stored addresses (a "hit" address) matches the incoming address and the last-modified bit associated with the hit address is set, then the new data can be written into the local SLC Storage 254 and no remote invalidation is required by the remote Storage Controller 160 because it is known that any required invalidation occurred on a previous write request. The Write Address Control logic 516 will re-enable the Write Input Register 502 thereby allowing it to capture another address, and will also send a write address clear signal to the Write Address Control logic 518 of Address ASIC-B 244, as shown by Line 520, so that the Write Input Register 504 is re-enabled. The timing for this signal is shown in Line 14 of FIG. 9. The Re-enable Write Input Address Register signal definition from Write Address Control 516 to Write Address Control 518 is explained in the following paragraph. Address ASIC-A 242 also sends an acknowledge signal back to IP1, as shown by Line 522, to indicate that the Storage Controller 158 is available to accept another write request from IP1. This timing is shown in Line 11 of FIG. 9.

Re-enable Write Input Address Register Signal

This signal tells the receiving Address ASIC (242 or 244) in the same local Storage Controller (e.g., 158) to re-enable the corresponding Write Input Address Register (e.g., 502 or 504). There is a separate master bit for each local write requester. Read requests are not disabled during write functions. The Re-enable Write Input Address Register Signal is defined as follows:

| Bits  | Description                              |
|-------|------------------------------------------|
| 1xxxx | Re-enable IPa Write Input Address Register |
| x1xxx | Re-enable IPb Write Input Address Register |
| xx1xx | Re-enable IPc Write Input Address Register |
| xxx1x | Re-enable IPd Write Input Address Register |
| xxxx1 | Re-enable I/O Write Input Address Register |

The cache coherency scheme requires that the second write request from the same IP not be allowed to penetrate any of the Segment Queues 506 or 528 until all required invalidation searches for the first write request have been processed. Note that Segment Queues 506 and 528 respectively receive as inputs, outputs from the In-registers 382–404 of FIG. 7. The processing of write requests occurs as follows: When the first write request and address is captured by Address ASIC-A 242 and Address ASIC-B 244, Address ASIC-A 242 also routes the address to the Duplicate Tags 302 for IP1 and IP2 while Address ASIC-B 244 routes the address to the Duplicate Tags 304 for IP3 and IP4. This is done because the Global SLC 154 is shared between all the local IPs and the cache block could be resident in the FLC of any of the IPs. If the write address hits in any of the Duplicate Tags, the FLC of the corresponding IP is informed as discussed above. When the write address is selected to be serviced by a Duplicate Tag, the Duplicate Tag informs the Duplicate Tag Ack Flag logic (532 and 534) that a search has been selected. It is known that the search will be completed in a fixed period of time. The Duplicate Tag Ack Flag logic maintains a status of which searches need to be performed and which searches are about to be completed. Control logic of Duplicate Tag Ack Flags 532 informs via control Lines 536 control logic of Duplicate Tag Ack Flags 534 when its search for IP1 and IP2 is complete. Control logic of Duplicate Tag Ack Flags 534 informs the control logic of Duplicate Tag Ack Flags 532 via control Lines 538 when its searches for IP3 and IP4 are complete. Because no searches need to be performed for the remote IPs in this case (recalling that the example is a hit in the SLC Tag 512 and the corresponding last-modified bit was set), their corresponding status bit in both the Duplicate Tag Ack Flags 532 and 534 are assumed to be set. When Address ASIC-A 242 finishes the search of its Duplicate Tag, Address ASIC-A sets its local invalidate acknowledge status flag in the Duplicate Tag Ack Flags 532 and signals Address ASIC-B 244 of this occurrence with the Local Invalidate Ack Signal via Line 536.

Local Invalidate Acknowledge Signal

The Local Invalidate Ack Signal is a three bit code that indicates which local requester just finished an invalidation search. It is one of the signals that is required to release the Segment Queue 506 or 528 for subsequent write requests. The signal is transferred between corresponding Address ASICs 242 and 244 in the same Storage Controller 158 in minor clock cycles. Line 538 illustrates the signals from Duplicate Tag Ack Flags 534 to Duplicate Tag Ack Flags 532. The signal code values are as follows:

| Bits | Description              |
|------|--------------------------|
| 000  | IPa (e.g., IP1 or IP5)   |
| 001  | IPb (e.g., IP2 or IP6)   |
| 010  | IPc (e.g., IP3 or IP7)   |
| 011  | IPd (e.g., IP4 or IP8)   |
| 100  | I/O (I/O Subsystem 1 or 2) |
| 101  | Not used                 |
| 110  | Not used                 |
| 111  | Idle                     |

When Address ASIC-A receives this invalidation acknowledge signal, it sets its Address ASIC-A Ack status flag to indicate that Address ASIC-A has completed its invalidate search. Address ASIC-B will also route the write address to its Duplicate Tags 304 and correspondingly send a Local Invalidate Ack Signal via Line 538 to Address ASIC-A and set its Ack Status Flag for Address ASIC-B. When all the status flags are set in both Address ASIC-A and Address ASIC-B, the respective Segment Control elements 508 and 540 are respectively signaled via Lines 542 and 544. The status flags include the following:

Internal flag—indicates whether the Address ASIC (Address ASIC-A 242 in this example) has completed the search of its Duplicate Tags.

Remote flag—indicates whether the remote Address ASIC (remote Address ASIC-A 246 in this example) has completed the search of its Duplicate Tags as indicated on signal Line 558.

Local Status flag—indicates whether the other local Address ASIC (Address ASIC-B 244 in this example) and the other remote Address ASIC (Address ASIC-B 248 in this example) have both completed searches of their respective Duplicate Tags 304 and 308.

Write Address Clear Status flag—indicates whether the remote Second-level Cache (154 for example) has completed invalidation of its SLC Tag (556 for example).

Continuing the example of the previous paragraph, the Segment Control elements then allow a second write request to be routed to the Segment Queue 506 or 528. In summary, no remote invalidation requests were required because they were effectively filtered by detecting that the local SLC Storage 254 had the most recent version of the requested data as indicated by the last-modified bit.

The timing diagram FIG. 10 illustrates the case where the local Global SLC 152 does not have the most recent version of the data addressed in a write request. The timing sequence of FIG. 10 is the same as the timing sequence of FIG. 9 up to the time where it is determined that the local Global SLC does not have the most recent version of the data addressed in a write request. At that time, Address ASIC-A 242 will route the address to Address ASIC-A 246 via the Remote Out Register 552 and progressing to the Remote In Register 554. The timing of this transfer is shown in Lines 12 and 15 of FIG. 10. Remote Out Queue Control 566 selects one of the write address inputs from the Remote Queue 553 to route to the Address ASIC-A 246. Remote Out Queue Control 568 provides similar control for Remote Queue 555. Note that the inputs to Remote Queue 553 and Remote Queue 555 are the respective outputs from Write Input Address Registers as shown.

After reaching the Remote In Register of Address ASIC-A 246, the address is routed through the Segment Queue (not shown) of Address ASIC-A 246. The SLC Tag 556 is searched for the address, and the corresponding entry is invalidated if there is a hit. Address ASIC-A 242 is informed when the remote SLC invalidation is complete via an acknowledge signal (not shown). Additionally, the address is routed to the Duplicate Tags 306 for IP5 and IP6. When the Duplicate Tags complete their search, a Remote Invalidate Acknowledge Signal is returned via Line 558 to Address ASIC-A 242 as to which search was completed.

Remote Invalidate Acknowledge Signal

The Remote Invalidate Acknowledge Signal is a three bit code that indicates which original requester has just finished an invalidate search of both the Duplicate Tags (e.g., 306 or 308 and remote SLC Tags (e.g., 556). The signal is a block identifier that matches remote requests to invalidate acknowledge signals. In the present example. Duplicate Tag 306 will return a Remote Invalidate Acknowledge Signal bit-code of 000 over Line 558 when it has completed its search. The signal is transferred across the remote interface between corresponding Address ASICs in minor cycles. The codes are as follows:

| Bits | Description |
| --- | --- |
| 000 | IPa (e.g., IP1 or IP5) |
| 001 | IPb (e.g., IP2 or IP6) |

-continued

| Bits | Description |
| --- | --- |
| 010 | IPc (e.g., IP3 or IP7) |
| 011 | IPd (e.g., IP4 or IP8) |
| 100 | I/O (e.g., I/O Subsystem 1 or 2) |
| 101 | Not used |
| 110 | Not used |
| 111 | Idle |

When Address ASIC-A 242 receives the Remote Invalidate Acknowledge Signal, it sets the appropriate Duplicate Tag Ack Flag 532 to indicate the completion of the search in Address ASIC-A 246.

Route Remote Invalidate Signal

In order to search the Duplicate Tags 308 as a result from a write request from IP1 to SLC Tag 512, Address ASIC-A 242 must first inform Address ASIC-B 244 that the search is required. This is accomplished with the Route Remote Invalidate Signal that is illustrated as Line 564 from the Remote Out Queue Control element 566 to the Remote Out Queue Control element 568. Another signal line (not shown) carries the Route Remote Invalidate Signal code from Remote Out Queue Control 568 to Remote Output Queue Control 566 for write requests that originate in Address ASIC-B 244. The Route Remote Invalidate Signal forces Address ASIC-B 244 to route the address from the specified Write Input Address Register (e.g., 504) to the Remote Out Register 570 and then oil to Remote In Register 562. The Route Remote Invalidate Signal is described along with FIG. 7.

The Remote In Register 562 feeds an address to Duplicate Tags 308 for IP7 and IP8. When the search of Duplicate Tag 308 is complete, Address ASIC-B 248 responds back to Address ASIC-B 244 with the Remote Invalidate Acknowledge Signal that is illustrated by Line 572. The timing of this signal is shown in Line 21 of FIG. 10. When Address ASIC-B 242 receives this signal, the corresponding Duplicate Tag Ack Flag is set. When the Duplicate Tag 304 search is complete and the Duplicate Tag Ack Flag 534 is set for Address ASIC-B 248, Address ASIC-B 244 will inform Address ASIC-A of this state via the signal Line 538. The timing of this signal is depicted in line 19 of FIG. 10. Once all the Invalidate Acknowledge Signals (Local and Remote) are returned, the Duplicate Acknowledge Flags logic elements 532 and 534 respectively signal Segment Control elements 508 and 540 to allow the next write request to be processed.

Address ASIC-A updates the last-modified flag that is associated with the write address in the SLC Tag 512. This indicates that future writes to the cache block by the local IPs do not require invalidation in the remote Duplicate Tags 306 and 308.

FIG. 11 is a table that shows the various actions taken in processing read and write requests with the relevant possible cache related states of the requested data. Generally, each row in the table designates either a read request or a write request and the processing that results from processing the designated request. Each row illustrates a different scenario. And, generally, the columns in the table designate the present state, next state, and actions taken in processing the designated request.

There are four main columns in the table: Request Type, Present State, Tag Invalidation Results, and Action. The Request Type is either a read request or a write request as shown. The Present State column indicates the present state of the data addressed in the request in the local and remote Global SLCs 152 and 154. The Tag Invalidation Results column indicates the invalidation states that result from processing the respective requests for the local and remote Global SLC Tags (148 and 186) and for the local and remote Duplicate Tags (192 and 194). Finally, the Action column indicates the actions taken in processing the respective requests.

The Present State column consists of a set of three states for each of the local and remote Global SLCs 152 and 154. The set of states includes Read Permission (Rd Pm), Last-modified (Last-mod.), and Miss. There are generally three bits that indicate the state of a block in the cache. The state bits are as follows:

Valid bit—indicates whether the block has been invalidated.

Last-modified bit—indicates whether the data was last modified in the respective cache.

Written bit—indicates whether the cache block has been modified and therefore, when it is aged out of cache whether the block needs to be written back to memory.

The Read Permission state is (defined as a block whose Valid bit is set and Last-modified bit is clear. The Last-modified state indicates whether the respective Global SLC has the most recent version of the referenced data (i.e., whether the last-modified bit in the SLC Tag is set). The Miss state indicates whether a hit resulted in searching the respective Global SLC Tag 184 or 186.

The Tag Invalidation Results column consists of a set of two states for each of the local and remote Global SLCs 152 and 154. The states are a result of processing the respective requests. The set of states includes the next validation state of the SLC Tag and the next validation state for the Duplicate Tags. The results indicate whether the data, if present in the respective cache, will be marked as invalid by clearing the associated valid bit in the respective tag.

In the Action column, the abbreviations that are used are as follows:

Ack—Acknowledge
adr—Address
Last-mod—Last-modified
Loc—Local
Mem—Memory
Rem—Remote
SLC—Second Level Cache
Xfer—Transfer The actions described are in pseudo-code format. Given the above explanation of the table of FIG. 11, the actions that result from processing the specified requests are self-explanatory and no further explanation is required.

Having described an exemplary embodiment of the invention in the drawings and accompanying description those skilled in the art will recognize that various modifications to the exemplary embodiment could be made without departing from the scope and spirit of the claims set forth below:

We claim:

1. A method for maintaining cache coherency in a shared memory multiprocessor data processing system, wherein the system includes a first processor coupled to a first cache and a second processor coupled to a second cache, and the first processor issues a write function code to the first cache, the write function code specifying data and a memory address at which to store the data, the method comprising the steps of:

invalidating the memory address in the second cache if the memory address was not last modified at the first cache;

writing the data in the first cache;

designating the memory address in the first cache as last-modified in the first cache; and inhibiting said invalidating the memory address in the second cache for subsequent write function codes issued by the first processor and referencing the memory address in the first cache while the memory address is designated as last-modified in the first cache.

2. A method for maintaining cache coherency in a shared memory multiprocessor data processing system, wherein the system includes a first processor coupled to a first first-level cache and a second processor coupled to a second first-level cache, the first first-level cache being coupled to a first second-level cache, the second first-level cache being coupled to a second second-level cache, the first second-level cache being coupled to the second second-level cache, and the first processor issues a write function code to the first first-level cache, the write function code specifying data and a memory address at which to store the data comprising the steps of:

invalidating the memory address in the second second-level cache if the memory address was not last modified in the first second-level cache;

writing the data in the first second-level cache, designating the memory address as last modified in the first second-level cache; and inhibiting invalidating the memory address in the second second-level cache for subsequent write function codes issued by the first processor and referencing the memory address in the first second-level cache while the memory address is designated as last-modified in the first second-level cache.

3. A cache architecture for a multiprocessor data processing system, wherein the system includes a plurality of instruction processors for executing instructions and for issuing read and write function codes and address codes for reading and writing data stored in a shared memory, the cache architecture comprising:

a plurality of first-level cache means, each mappable to all addresses of the shared memory and coupled to a different respective one of the instruction processors for receiving the address codes;

first second-level cache means mappable to all addresses of the shared memory, directly coupled to the shared memory and coupled to first predetermined ones of said plurality of first-level cache means for receiving the address codes from said first predetermined ones of said plurality of first-level cache means;

second second-level cache means mappable to all addresses of the shared memory, directly coupled to the shared memory, coupled to second predetermined ones of said plurality of first-level cache means for receiving the address codes from said second predetermined ones of said plurality of first-level cache means, and directly coupled to said first second-level cache means, said second second-level cache means for receiving the address codes from said first second-level cache means, and said first second-level cache means for receiving the address codes from said second second-level cache means;

first coherency logic means coupled to said first second-level cache means and coupled to said first predetermined ones of the plurality of first-level cache means for providing a first invalidation signal to said second second-level cache means when an address in said first second-level cache means is written;

second coherency logic means coupled to said second second-level cache means and coupled to said second predetermined ones of the plurality of first-level cache means for providing a second invalidation signal to said first second-level cache means when an address in said second second-level cache means is written;

first filter means coupled to said first coherency logic means for preventing said first coherency logic means from providing said first invalidation signal if an address in said first second-level cache means is written and said address was last-modified in said first second-level cache means; and second filter means coupled to said second coherency logic means for preventing said second coherency logic means from providing said second invalidation signal if an address in said second second-level cache means is written and said address was last-modified in said second second-level cache means.

4. The cache architecture of claim 3, further comprising:

first second-level cache tag means coupled to said first second-level cache means having a first plurality of address entry means, each of said first plurality of address entry means for indicating a respective one or more addresses of the shared memory that are cached in said first second-level cache means;

a first plurality of last-modified indicator means, each associated with a different respective one of said first plurality of address entry means for indicating whether said respective one or more addresses of the shared memory that are cached in said first second-level cache means were last written in said first second-level cache means;

second second-level cache tag means coupled to said second second-level cache means having a second plurality of address entry means, each of said second plurality of address entry means for indicating one or more addresses of the shared memory that are cached in said second second-level cache means; and a second plurality of last-modified indicator means, each associated with a different respective one of said second plurality of address entry means for indicating whether said respective one or more addresses of the shared memory that are cached in said second second-level cache means were last written in said second second-level cache means.

5. The cache architecture of claim 3, further comprising:

first first-level cache tag means associated with said first predetermined ones of the plurality of said first-level cache means;

second first-level cache tag means associated with said second predetermined ones of the plurality of said first-level cache means;

first duplicate tag means coupled to said first first-level cache tag means and coupled to said first coherency logic means; and second duplicate tag means coupled to said second first-level cache tag means and coupled to said second coherency logic means.

6. A cache system for a multiprocessor data processing system, wherein the data processing system includes a plurality of instruction processors for providing address signals to a shared memory to thereby read data signals from, or write data signals to, selectable addresses within the shared memory, the cache system, comprising:

a plurality of first-level caches, each mappable to all of the addresses of the shared memory and coupled to a respective one of the instruction processors for receiving the address signals from said respective one of the instruction processors;

a first second-level cache mappable to all of the addresses of the shared memory, uniquely directly coupled to the shared memory and coupled to a first set of predetermined ones of said plurality of first-level caches for receiving the address signals from said first set of predetermined ones of said plurality of first-level caches;

a first coherency logic circuit coupled to said first second-level cache and coupled to said first set of predetermined ones of said plurality of first-level caches, capable of providing a first invalidation signal to said second second-level cache and to said second set of predetermined ones of said plurality of said first-level caches when an address in said first second-level cache is written;

a second second-level cache mappable to all of the addresses of the shared memory, uniquely directly coupled to the shared memory, coupled to a second set of predetermined ones of said plurality of first-level caches for receiving the address signals from said second set of predetermined ones of said plurality of first-level caches, and uniquely directly coupled to said first second-level cache, said second second-level cache being capable of receiving the address signals from said first second-level cache, and said first second-level cache being capable of receiving the address signals from said second second-level cache;

a second coherency logic circuit coupled to said first coherency logic circuit, coupled to said second second-level cache, and coupled to said second set of predetermined ones of said plurality of first-level caches capable of providing a second invalidation signal to said first second-level cache and to said first set of predetermined ones of said plurality of said first-level caches when an address in said second second-level cache is written;

a first filter circuit coupled to said first coherency logic circuit to prevent said first coherency logic circuit from providing said first invalidation signal if an address cached in said first second-level cache is written and said address was last-modified in said first second-level cache; and a second filter circuit coupled to said second coherency logic circuit to prevent said second coherency logic circuit from providing said second invalidation signal if an address cached in said second second-level cache is written and said address was last-modified in said second second-level cache.

7. A cache architecture for a data processing system, wherein the system includes a plurality of units and a shared memory, the plurality of units for making requests for data stored in the shared memory, the cache architecture, comprising:

a first cache directly coupled to the shared memory and mappable to all addresses of the shared memory, said first cache coupled to first predetermined ones of the plurality of units to receive first requests to access selected ones of the shared memory addresses;

a second cache directly coupled to the shared memory and mappable to all addresses of the shared memory, said second cache coupled to second predetermined ones of the plurality of units to receive second requests to access selected ones of the shared memory addresses, said second cache coupled to said first cache to allow said second cache to provide predetermined ones of said second requests to said first cache, and to allow said first cache to provide predetermined ones of said first requests to said second cache; and a first filter circuit coupled to said first cache to prevent any of said predetermined ones of said first requests which is a request to access a shared memory address for which the contents were last modified within said first cache from causing said first cache to provide an invalidation request to said second cache.

8. The cache architecture of claim 7, and further including a second filter circuit coupled to said second cache to prevent any of said predetermined ones of said second requests requesting access to a shared memory address for which the contents were last modified within said second cache from causing said second cache to provide an invalidation request to said first cache.

9. The cache architecture of claim 8, and further including a first coherency control circuit coupled to said first cache to store a first set of last-modified indicators, each of said first set of last-modified indicators associated with respective ones of the shared memory addresses to indicate whether the contents of said respective ones of the shared memory addresses were last-modified within said first cache.

10. The cache architecture of claim 9, wherein said first coherency control circuit includes a first control circuit to receive each of said predetermined ones of said second requests, and in response to said each of said predetermined ones of said second requests, to reset an associated one of said first set of last-modified indicators which is associated with the shared memory address for which access was requested.

11. The cache architecture of claim 10, and further including a second coherency control circuit coupled to said second cache to store a second set of last-modified indicators, each of said second set of last-modified indicators associated with respective ones of the shared memory addresses to indicate whether the contents of said respective ones of the shared memory addresses were last-modified within said second cache.

12. The cache architecture of claim 11, wherein said second coherency control circuit includes a second control circuit to receive each of said predetermined ones of said first requests, and in response to said each of said predetermined ones of said first requests, to reset an associated one of said second set of last-modified indicators which is associated with the shared memory address for which access was requested.

13. A cache architecture for use in a data processing system including a shared memory, and a plurality of instruction processors, the plurality of instruction processors for providing memory addresses to address the shared memory, the cache architecture, comprising:

a first cache memory coupled to the shared memory and being mappable to all memory addresses within the shared memory, said first cache memory to receive first ones of the memory addresses provided by first ones of the plurality of instruction processors, said first cache memory to store data signals associated with said first ones of the memory addresses;

a second cache memory coupled to the shared memory and being mappable to all memory addresses within the shared memory, said second cache memory to receive second ones of the memory addresses provided by second ones of the plurality of instruction processors, said second cache memory to store data signals associated with said second ones of the memory addresses, said second cache memory being coupled to said first cache memory, and whereby said first cache memory provides ones of said first memory addresses as first invalidation requests to said second cache memory, said first invalidation requests to invalidate ones of the data signals stored within said second cache memory when data signals associated with said ones of said first memory addresses are modified within said first cache memory; and a first filter circuit coupled to said first cache memory to prevent any of said ones of said first memory addresses that are associated with data signals for which the most recently updated copy is stored in said first cache memory from being provided as first invalidation requests to said second cache memory.

14. The cache architecture of claim 13, wherein said second cache memory provides ones of said second memory addresses as second invalidation requests to said first cache memory, said second invalidation requests to invalidate ones of the data signals stored within said first cache memory when said data signals associated with said ones of said second memory addresses are modified within said second cache memory; and a second filter circuit coupled to said second cache memory to prevent any of said ones of said second memory addresses that are associated with data signals for which the most recently updated copy is stored in said second cache memory from being provided as second invalidation requests to said first cache memory.

15. The cache architecture of claim 14, and further including a first storage device coupled to said first cache memory to store a first set of last-modified signals, each of said first set of last-modified signals associated with first respective ones of the memory addresses to indicate whether the contents of said first respective ones of the memory addresses were last-modified within said first cache memory.

16. The cache architecture of claim 15, and further including a second storage device coupled to said second cache memory to store a second set of last-modified signals, each of said second set of last-modified signals associated with second respective ones of the memory addresses to indicate whether the contents of said second respective ones of the memory addresses were last-modified within said second cache memory.

17. The cache architecture of claim 16, and further including:

a first tag storage device coupled to said first cache memory to store first invalidation indicators, each of said first invalidation indicators associated with respective ones of the memory addresses stored in said first cache memory to indicate whether said respective ones of the memory addresses stored in said first cache memory have been designated as invalidated in said first cache memory; and a second tag storage device coupled to said second cache memory to store second invalidation indicators, each of said second invalidation indicators associated with respective ones of the memory addresses stored within said second cache memory to indicate whether said respective ones of the memory addresses stored within said second cache memory have been designated as invalidated in said second cache memory.

18. The cache architecture of claim 13, wherein said first cache memory and second cache memory are second-level cache memories, and further including:

a first first-level cache memory coupled to said first cache memory and coupled to said first ones of the plurality of instruction processors to receive said first ones of the memory addresses, said first first-level cache memory to provide said first ones of the memory addresses to said first cache memory if the contents of said first ones of the memory addresses are not stored in said first first-level cache memory; and a second first-level cache memory coupled to said second cache memory and coupled to said second ones of the plurality of instruction processors to receive said second ones of the memory addresses, said second first-level cache memory to provide said second ones of the memory addresses to said second cache memory if the contents of said second ones of the memory addresses are not stored in said second first-level cache memory.

19. A cache architecture for a data processing system, wherein the system includes a memory and a plurality of units for making requests to read from, or write to, the memory, the cache architecture, comprising:

first cache means for storing first selected ones of the memory addresses, said first cache means for receiving first requests from first predetermined ones of the plurality of units to read from, or write to, said first selected ones of the memory addresses;

second cache means for storing second selected ones of the memory addresses, said second cache means for receiving second requests from second predetermined ones of the plurality of units to read from, or write to, said second selected ones of the memory addresses, said second cache means for generating a first invalidation request to send to said first cache means when the contents of any one of said second selected ones of the memory addresses are being modified in said second cache means; and filter means for preventing said invalidation request from being sent to said first cache means if said second cache means is storing the latest copy of the contents of said any one of said second selected ones of the memory addresses which is being modified.

20. The cache architecture of claim 19, wherein said first cache means includes circuits for generating a second invalidation request to send to said second cache means when the contents of any one of said first selected ones of the memory addresses are being modified in said first cache means, and further comprising second filter means for preventing said second invalidation request from being sent to said second cache means if said first cache means is storing the latest copy of said any one of said first selected ones of the memory addresses which is being modified.

21. The cache architecture of claim 20, and further comprising first storage means for storing a first set of last-modified indicators, each of said last-modified indicators in said first set for indicating whether the contents of respective ones of said first selected ones of the memory addresses are last modified in said first cache means; and second storage means for storing a second set of last-modified indicators, each of said last-modified indicators in said second set for indicating whether the contents of respective ones of said second selected ones of the memory addresses are last modified in said second cache means.

* * * * *